United States Patent [19]
Clark

[11] Patent Number: 6,052,996
[45] Date of Patent: Apr. 25, 2000

[54] HEAT-WORK CYCLE FOR STEAM CYCLE ELECTRIC POWER GENERATION PLANTS

[76] Inventor: John C. Clark, 7024 McClellan Rd., Mechanicsville, Va. 23111

[21] Appl. No.: 09/023,427

[22] Filed: Feb. 13, 1998

[51] Int. Cl.[7] .................................................. F01K 25/02
[52] U.S. Cl. .............................................. 60/650; 60/677
[58] Field of Search .............................. 60/645, 650, 670, 60/677

[56] References Cited

U.S. PATENT DOCUMENTS

| | | | |
|---|---|---|---|
| 4,229,257 | 10/1980 | Förster | 176/60 |
| 4,361,009 | 11/1982 | Schluderberg | 60/659 |
| 4,428,190 | 1/1984 | Bronicki | 60/655 |
| 4,466,249 | 8/1984 | Frutschi | 60/648 |
| 4,693,072 | 9/1987 | McLean et al. | 60/39.02 |
| 4,702,081 | 10/1987 | Vinko | 60/655 |
| 4,907,410 | 3/1990 | Chang | 60/641.6 |
| 4,976,107 | 12/1990 | Korpela | 60/645 X |
| 5,131,231 | 7/1992 | Trimble et al. | 60/650 X |
| 5,142,869 | 9/1992 | Iizuka et al. | 60/650 X |
| 5,410,869 | 5/1995 | Muller | 60/39.02 |
| 5,431,016 | 7/1995 | Simpkin | 60/650 |
| 5,437,150 | 8/1995 | Latham et al. | 60/39.02 |
| 5,437,157 | 8/1995 | Bronicki | 60/655 |
| 5,457,721 | 10/1995 | Tsiklauri et al. | 376/317 |
| 5,497,624 | 3/1996 | Amir et al. | 60/641.5 |
| 5,570,578 | 11/1996 | Saujet et al. | 60/647 |
| 5,675,970 | 10/1997 | Yamada et al. | 60/645 X |

*Primary Examiner*—Hoang Nguyen
*Attorney, Agent, or Firm*—Dickstein Shapiro Morin & Oshinsky LLP

[57] ABSTRACT

A heat recovery apparatus and method suitable for steam cycle electrical generating plants including at the exhaust of a steam turbine one or more heat transfer units for capturing the heat in steam, including the latent heat of vaporization of the steam. Heat is transferred from the steam to a working fluid in at least one heat transfer unit. The heat transfer unit may also include a cooling apparatus. Piping and valves establish communication of the working fluid between the heat transfer unit and the gas turbine generator. The working fluid is moved through the system by selectively isolating sections of the piping and adding or taking away heat from adjacent sections to create pressure differentials. Connecting adjacent sections results in the movement of the working fluid mass as a result of the pressure equalization.

39 Claims, 10 Drawing Sheets

9A 9B

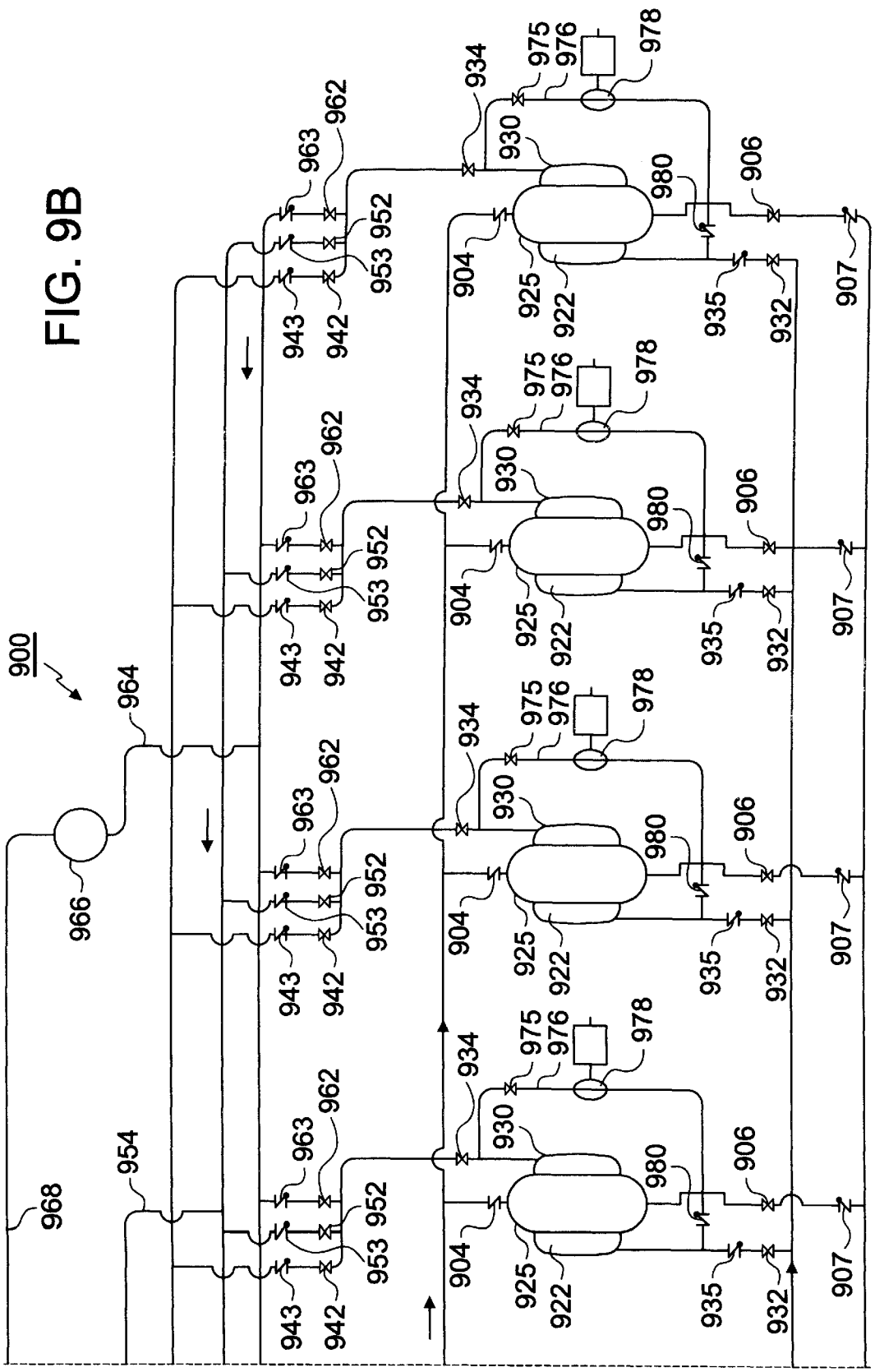

HEAT-WORK CYCLE FOR STEAM CYCLE ELECTRIC POWER GENERATION PLANTS

BACKGROUND

The present invention relates to electric power generation and more particularly to a multi-cycle system for driving electric power generating turbines.

Water is used in power production systems because it is plentiful and inexpensive. The physical properties of water, whether in the ice, water or steam state, are well understood. For example, the amount of heat which must be taken in by a given mass of water to cause a change of state from liquid to gas (water to steam) is equal to the amount of heat which must be given up by the same mass of steam to cause the change of state from gas to liquid (steam to water). That heat is called the latent heat of vaporization. Conventional steam turbines efficiently convert the "mechanical" energy in steam to useful energy; however, the latent heat of vaporization in steam cannot be converted by conventional steam turbines to useful energy. That heat becomes waste heat and is transferred to the ultimate heat sink, the environment.

Conventional steam cycle commercial electric power generator systems have a low thermal efficiency, that is, the ratio of "heat converted to electric power by the system" to "total heat put into the system" is low. The thermal efficiency of a typical system is in the range of about 30 to about 35 percent. This low thermal efficiency is in large part due to the inability of conventional systems to convert the latent heat of vaporization of the steam into electric power.

Conventional steam cycle electric power generation plants burn fuels to make steam. The steam drives a turbine, which in turn drives an electric generator. The fuel may be fossil fuels such as oil and coal, or nuclear fuels, primarily uranium. For example, in a pressurized water reactor nuclear power plant, the uranium is "burned" in the reactor pressure vessel to heat water (reactor coolant), which is pumped in a high pressure "primary" closed loop through a heat exchanger, where it gives up heat, and then back to the reactor pressure vessel to be reheated and recycled. Water in a "secondary" loop (feedwater) is also pumped through the heat exchanger. In the heat exchanger, the feedwater in the secondary loop, which is at a relatively low pressure, is kept separate from the higher pressure reactor coolant in the primary loop. As the reactor coolant flows through the tubing in the heat exchanger, it gives up heat to the interior surface of the tubing. That heat is conducted through the tubing walls to the exterior surface of the tubing, where it is transferred to the feedwater.

As the molecules of the feedwater take in that specific quantity of heat from the exterior surface of the heat exchanger tubing, called the latent heat of vaporization, they flash into steam. The steam flows under pressure to the steam turbine, where, through pressure and temperature decreases, the steam gives up energy to the turbine blades (buckets) that translate the energy from the steam to rotational torque. That torque is conveyed to the turbine shaft, which drives the generator, producing electricity. As the steam exits the steam turbine, it flows at reduced pressure into another heat exchanger, called a condenser. There the steam gives up waste heat to the exterior surface of the tubing in the condenser, causing the steam to condense into water. The waste heat is conducted through the tubing walls to the interior surface of the condenser tubing, where it is transferred to circulating water. The circulating water takes away the waste heat to the ultimate heat sink, the environment (e.g., river, lake, atmosphere). Most of the waste heat is the latent heat of vaporization, which as was previously indicated, cannot be converted by conventional power generation systems to electricity. In fact, more than half of the heat produced by the combustion of fossil fuels or the fissioning of nuclear fuels, is a latent-heat-of-vaporization loss.

Some existing systems increase thermal efficiency by increasing the amount of heat transferred to the steam, rather than utilizing the latent heat of vaporization to decrease the amount of waste heat. This approach increases the thermal efficiency of the overall system because latent heat of vaporization is a smaller percentage of the total heat in the steam. However, this approach increases the expense of operation because it requires burning more fuel and adding more equipment.

Some steam cycle electric power generation systems have been proposed that use waste heat in a secondary gas cycle to generate power. However, these systems employ devices to increase the pressure (pumps or compressors) or to increase the temperature (superheaters) of the circulating gas. Some systems introduce a fuel to the gas turbine to generate more power. The cost of implementing such systems is high and none of these proposed systems have gained acceptance in the power generation industry.

Accordingly, there is a need for a more efficient utilization of heat in a steam cycle electric power generation plant to reduce the amount of fuel burned and to reduce the amount of waste heat dumped into the environment.

SUMMARY

The present invention alleviates to a great extent the deficiencies in such conventional systems by providing, in a steam cycle electric power generation system, a heat source, a working fluid, a working fluid conduit having a plurality of working fluid conduit sections, first and second working fluid valves positioned on the working fluid conduit and selectively operable for opening and closing said working fluid conduit to flow of said working fluid, the working fluid conduit sections include a heat transfer section positioned between the pair of valves, an outlet section positioned downstream from the heat transfer section and an inlet section positioned upstream from the heat transfer section. The heat source is adapted to transfer latent heat of vaporization of the steam to the working fluid in the heat transfer section. The first and second valves are operable to be closed to isolate the heat transfer section when the heat source is inputting heat to the working fluid to raise the temperature and pressure of the working fluid in the heat transfer section. The second valve is operable to be opened after heat has been input by the heat source to allow the working fluid to expand into the downstream outlet section and the first valve is operable to be opened before heat is added to allow the working fluid from the upstream inlet section to expand into the heat transfer section.

In one aspect of the present invention, a portion of the latent heat of vaporization of a heat source, preferably steam, is captured, transmitted to a gas turbine, and used to generate electric power.

In another aspect of the present invention, the working fluid is moved through the system by adding and/or removing heat from adjacent working fluid conduit sections to create pressure differentials sufficient to move a predetermined mass of working fluid upon the interconnection of such adjacent sections with the resulting expansion of the working fluid from the higher pressure section into the lower pressure section.

In another aspect of the present invention, a steam cycle electric power generation system includes a heat source, a working fluid and a cooling apparatus. The working fluid is adapted to accept heat from the heat source and to give up the heat to the cooling apparatus. The heat source is adapted to heat the working fluid at a heat transfer location and the cooling apparatus is adapted to remove heat from the working fluid at that heat transfer location.

In another aspect of the present invention, three fluid loops converge on a heat exchange location. The three loops include a steam/water loop, a working fluid loop and a waste heat removal loop. The heat exchange location includes at least one heat transfer unit. The steam loop extends through the heat exchange location. Two sets of passageways extend through the heat transfer unit at each heat exchange location, one set adapted for carrying a working fluid and another set adapted for carrying a cooling fluid. In one preferred embodiment, the two sets of passageways are encompassed within a singular tube, with the cooling fluid passageways positioned annularly inside of the working fluid passageways. In an alternative embodiment, each cooling fluid passageway is located proximate to two or more working fluid passageways.

Another aspect of the present invention is that a heat transfer unit is in communication with a primary working fluid tank. The tank is positioned on the working fluid line downstream from the heat transfer location and upstream from a gas turbine and in selective fluid communication with the working fluid output of the heat transfer unit.

Another aspect of the present invention is that the heat transfer location may include two or more discrete heat transfer units aligned in parallel along the steam line. Two heat transfer units are in selective fluid communication with a single working fluid tank and the fluid communication of such tank alternates between the heat transfer units in order that a greater amount of working fluid may be collected within the tank.

Another aspect of the present invention includes heat transfer units arranged in series, each succeeding heat transfer unit being smaller in size than the preceding one so that the pressure of the working fluid is progressively increased as the working fluid is moved through the heat transfer units in series.

In another preferred embodiment of the present invention, a steam cycle electric power generation system is provided comprising a heat source, a working fluid, a first converter adapted to convert heat energy to mechanical energy, and a second converter adapted to convert mechanical energy into electrical energy. The heat source is adapted to heat the working fluid and the working fluid is adapted to accept heat from the heat source at a heat transfer location.

In one aspect of this preferred embodiment, the heat transfer location is within a heat exchanger which is configured to position the heat source proximate the working fluid within said heat exchanger. In addition, a working fluid conduit is included which is adapted to allow flow into and out of the heat exchanger, the working fluid conduit including a first and second control valve, the first valve positioned upstream of the heat exchanger and the second valve positioned downstream of the heat exchanger, the valves adapted to open and close sequentially so as to permit movement of the working fluid through the heat exchanger.

In another aspect, the steam cycle electric power generation system includes a high-pressure line, an intermediate-pressure line, and a low-pressure line, each line being in fluid connection with said heat exchanger and said first converter. Each line includes a control valve, a check valve, and a receiver positioned between the heat exchanger and the first converter.

In another aspect, the first converter includes a high-pressure turbine on the high-pressure line, an intermediate-pressure turbine on the intermediate-pressure line, and a low-pressure turbine on the low-pressure line, such that the heated working fluid flows from the heat exchanger into the high-pressure line, the intermediate-pressure line, and the low-pressure line, through the high-pressure receiver, the intermediate-pressure receiver, and the low-pressure receiver, and into the high-pressure turbine, the intermediate-pressure turbine, and the low-pressure turbine.

In another aspect, the high-pressure turbine is in fluid connection with the intermediate-pressure turbine, which is in fluid connection with the low-pressure turbine such that an exhaust of working fluid depleted of at least some of its heat from the high-pressure turbine is combined with an exhaust of heated working fluid depleted of at least some of its heat from the intermediate-pressure turbine and the exhaust of the intermediate-pressure turbine is combined with an exhaust of heated working fluid depleted of at least some of its heat from the low-pressure turbine.

In another aspect, the steam cycle electric power generation system includes a regenerator in fluid connection with the low-pressure turbine, wherein the exhaust from the low-pressure turbine flows into and through the regenerator, and with the heat exchanger through the working fluid conduit.

In another aspect, the working fluid is air and the system includes an air intake, a compressor in fluid connection with the regenerator, a compressed air receiver positioned on the working fluid conduit between the regenerator and the heat exchanger.

In another aspect, the heat source is steam and the system includes a steam supply conduit supplying the steam to the heat transfer location, and a condensate return conduit in fluid connection with the heat transfer location. The steam supply conduit includes a first and second control valve, the first valve positioned upstream of the heat exchanger and the second valve positioned downstream of the heat exchanger, the valves adapted to open and close sequentially so as to permit movement of the steam through the heat exchanger.

The resultant efficiency of a power plant utilizing the present invention is expected to be increased. This capture of the latent heat of vaporization of steam may increase the capacity and the useful life of the existing plant by up to double, or more.

It is an object of the present invention to provide a system to increase the thermal efficiency of steam cycle electric power generation plants.

It is a further object of the present invention to increase steam cycle electric power generation plant thermal efficiency by converting latent heat of vaporization of the steam to electricity.

It is a further object to increase the life of a steam cycle generating plant by allowing the plant to produce increased levels of electrical power with given fuel resources.

It is a further object of the present invention to reduce the costs of operating the plant by reducing the fuel resources needed to produce a given amount of power.

It is a further object of the present invention to reduce the amount of mechanical pumping by providing a system which thermodynamically pumps a working fluid.

With these and other objects, advantages and features of the invention that may become apparent, the nature of the invention may be more clearly understood by reference to the following detailed description of preferred embodiments of the invention, the appended claims and the several drawings attached hereto.

DETAILED DESCRIPTION OF PREFERRED EMBODIMENTS

Figure 1:
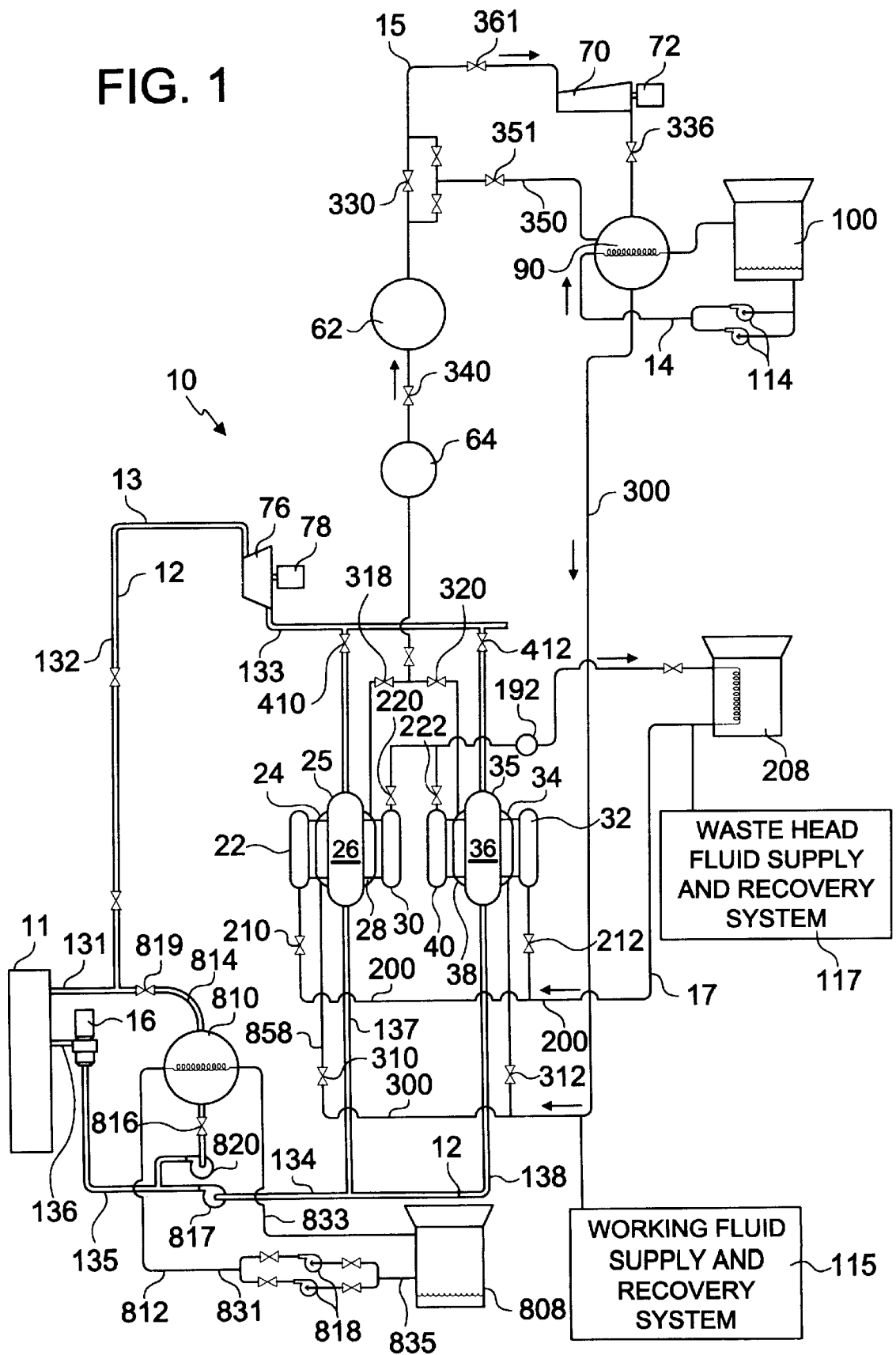
FIG. 1 is a schematic representation of a steam cycle electric power generation system using a heat work cycle system according to a preferred embodiment of the present invention.

Refer now to FIG. 1, there being shown a steam cycle electric power generation system, generally designated by reference numeral 10, according to a preferred embodiment of the present invention. The system 10 includes three main fluid flow loops through which fluids flow. Two of the three fluid flow loops drive turbines and their connected electric generators. The three main loops are a steam/water loop 13, a working fluid loop 15, and a waste heat removal 17. The system 10 also includes two secondary fluid loops that act to cool the working fluid and the steam. The two secondary loops are a working fluid cooling loop 14 and a steam/water condensing loop 812.

The three main loops 13, 15 and 17 all flow in separate paths through a pair of heat transfer units 25 and 35. In each of the heat transfer units 25 and 35, when steam is flowing through the unit 25 or 35, heat from the steam in the steam/water loop 13 is transferred to the working fluid in the working fluid loop 15. The working fluid of the embodiment of FIG. 1 is nitrogen gas. Nitrogen is a plentiful, cheap, non-toxic gas with good heat transfer and heat capacitance properties. It exists as a gas over a wide range of temperatures and pressures, and thus may be used as a working fluid without changing states from a gas to a liquid. It is also a suitable working fluid for gas turbines.

Also, selectively, to the extent required, heat may be removed from the working fluid in the heat transfer units 25 and 35 by the cooling fluid in the waste heat removal 17. Helium gas is used in the embodiment of FIG. 1 as the cooling fluid. Helium gas is inert and has good heat transfer and heat capacitance properties and exists as a gas and, like nitrogen, may be used over a wider range of temperatures and pressures in the gaseous state without changing to a liquid.

Like the waste heat removal 17, each of the secondary fluid loops 14 and 812 also serve to remove excess heat from the system 10, but at locations outside of the heat transfer units 25 and 35. In this embodiment, water is used for the fluid in loops 14 and 812.

Figure 6:
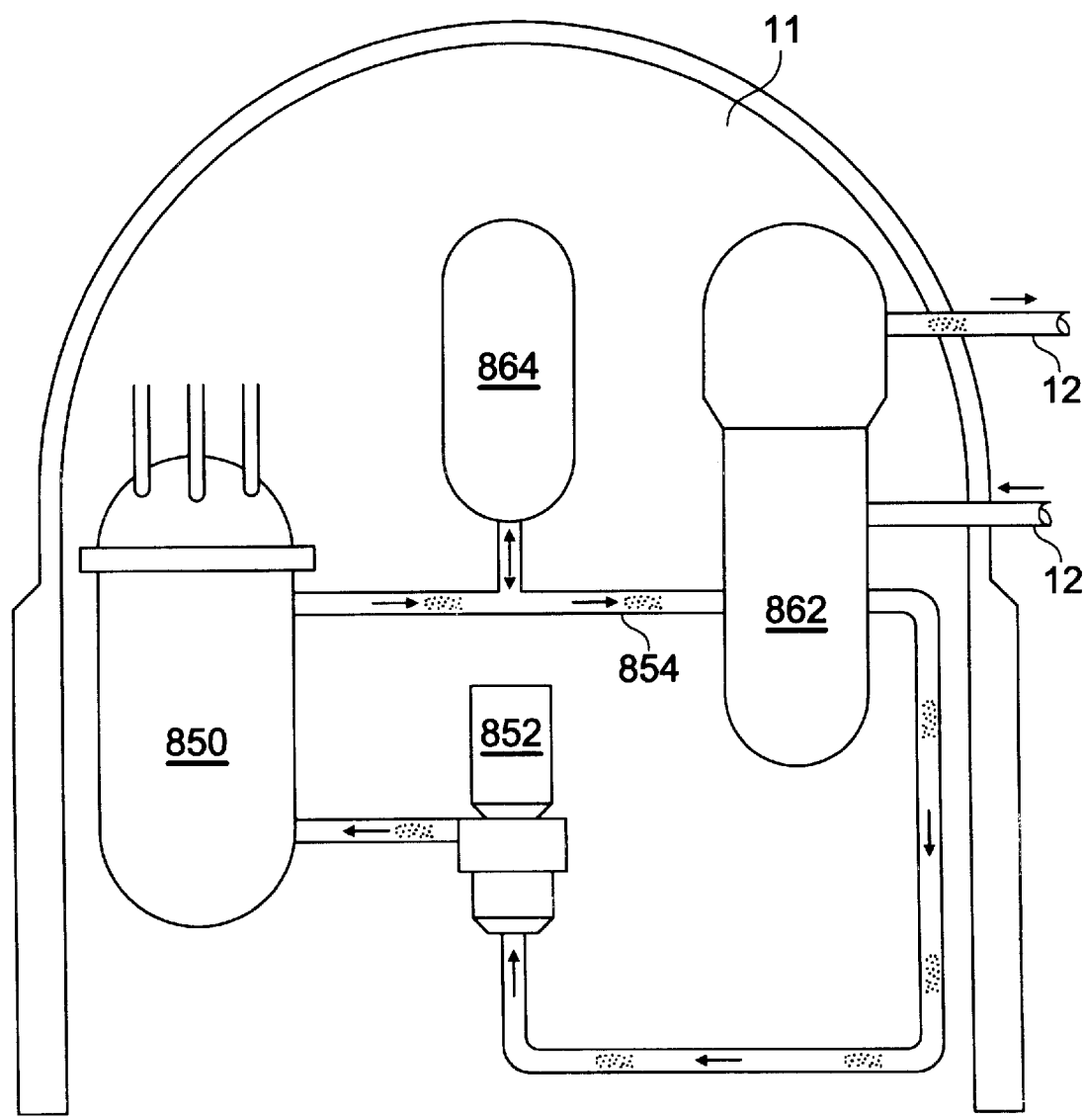
FIG. 6 is a schematic representation of the steam generating plant of FIG. 1.

The steam/water loop 13, as depicted in FIGS. 1 and 6 includes a steam generating plant 11, a steam/water transmission line 12, a steam, or "topping," turbine 76 driving an electric power generator 78, quick response valves 410 and 412, chambers 26 and 36, including hotwells at their lower portions, of the heat transfer units 25 and 35, respectively, a low pressure pump 817 and a feed water pump 16, an excess steam condenser 810, and a low pressure pump 820. The loop 13 also includes a steam by-pass line 814, and by-pass valves 816 and 819. The topping turbine 76 is so named due to its positioning within the plant upstream from the three fluid loops 13, 15 and 17.

The steam generating plant 11 provides the steam that flows through steam/water transmission line 12 to the topping turbine 76. In this embodiment of the present invention, the steam cycle generating plant 11 is a pressurized water reactor nuclear plant. Alternatively, other conventional steam generating plants may be used, such as fossil fuel simple or combined cycle boilers, boiling water reactors, resource recovery simple cycle or combined cycle boilers, or any other type of plant that generates steam.

Referring to FIGS. 1 and 6, the steam generating plant 11 includes a reactor vessel 850, a hot water transmission line 854, a reactor coolant pump 852, a pressurizer 864, and a steam generator 862. The reactor in the vessel 850 heats up water in the hot water loop 854. The reactor pump 852 forces the water through the reactor vessel 850, by the pressurizer 864 and then to the steam generator 862.

The feedwater pump 16 in FIG. 1 pumps water in line 12 through the steam generator 862 in FIG. 6 where the water in line 12 is converted to steam. The steam generation system 11 shown in FIG. 6 is a simplified version showing only the basic component parts.

As shown in FIG. 1, the steam travels along portions 131 and 132 of line 12 to the steam turbine 76. The steam expands through and drives the turbine that in turn drives the electric generator 78 to produce electric power. The steam exits the turbine to portion 133 of line 12 and travels through valves 410 and 412, when open, to the heat transfer units 25 and 35, respectively.

In the heat transfer units 25 and 35, heat from the steam is transferred to fluids contained in tubes positioned inside the heat transfer units causing the steam to condense to water. Thus the heat transfer units 25 and 35 are essentially condensers with respect to the steam/water loop 13. This process is explained further below with reference to FIG. 2. The liquid water then exits the heat transfer units 25 and 35 at portions 137 and 138, respectively, of steam/water line 12. The water then travels down portion 134 of line 12 and is pumped by a low pressure pump 817 through portion 135 of line 12 to the feedwater pump 16. The pump 817 also ensures that water does not flow back upstream towards the heat transfer units 25 and 35. The feedwater pump 16 pumps the water back into the steam generator plant 11 through portion 136 of line 12.

In the embodiment illustrated, the steam turbine 76 and the coupled generator 78 convert some of the energy in the steam into electricity, which reduces the temperature and pressure of the steam exiting the steam generator 11 before it enters the heat transfer units 25 and 35. The use of the steam turbine 76 to adjust the steam conditions allows for the use of standard sized heat transfer units with a variety of types of steam generating plants 11. An optimized configuration (number and arrangement) of heat transfer units can be chosen for accepting steam flow at a predetermined mass flow rate and predetermined temperature and pressure. In other configurations, a steam turbine 76 may be unnecessary.

It is desirable to operate steam generation plants at full power. Therefore in typical applications the steam is always being produced by the operating plant 11 at a predetermined rate. However, if a portion of the system is closed off or if for any reason not operating to remove heat from the steam, the system 10 is not able to use all of the steam produced by the plant 11. In such cases, valves 819 and 816 are opened and some portion of the steam is diverted through by-pass line 814 to the condenser 810. The secondary steam/water condensing loop 812 is operated to remove the heat from the steam. The steam introduced into the condenser 810 is cooled by water pumped through the condenser 810 from cooling tower 808 by low pressure pumps 818 through lines 835, 831 and 833. The water in loop 13 is then pumped back to the feedwater pump 16 by low pressure pump 820.

In normal operation, the steam flows alternately to the heat transfer units 25 and 35. When valve 410 opens, the steam enters the heat transfer unit 25 where heat from of the steam is transferred to the working fluid loop 15. The working fluid cools the steam and condenses it to water, thereby the latent heat of vaporization of the steam is transferred to the working fluid.

The steam/water loop 13 includes three systems: a main steam system, a condensate system, and a feedwater system. The main steam system includes a process control system and a configuration of piping and valves through which the steam flows, under pressure, from the steam source to the steam turbine 76 and then to the heat transfer units 25, 35. Part of the energy in the steam is transferred to the turbine blades (buckets), which translate those forces to rotational torque. The rotational torque is imparted to the turbine shaft, which rotates the armature of the coupled generator 78 in an electromagnetic field, producing electricity. Upon exiting the steam turbine 76, the steam flows at reduced pressure to the heat transfer units 25, 35, where the energy in the steam is conductively transferred through the walls of the heat exchange tubing 140 (described in greater detail below) to the working fluid. As the latent heat of vaporization is transferred from the steam through the walls of the tubing 140 into the working fluid, the steam condenses, forming droplets of water. That water collects in the hotwell (described in greater detail below) of the heat transfer units 25, 35.

The second system in the steam/water loop 13 is the condensate system. The condensate system includes a process control system and a configuration of piping, valves, pumps, and related equipment, whose primary function is to transport condensate, under pressure, from the hotwell of the heat transfer units 25, 35 to the feedwater pump 16. A secondary function of the condensate system is to transport condensate from the hotwell of the main steam turbine bypass condenser 810 to the feedwater pump 16. The condensate system terminates at the suction of the feedwater pump 16.

The feedwater system includes a process control system and a configuration of piping, valves, pumps and related equipment. The system's primary function is to transport feedwater, under pressure, from the feedwater pump 16 through line 136 to the feedwater inlet port of the steam production system 11.

Figure 2:
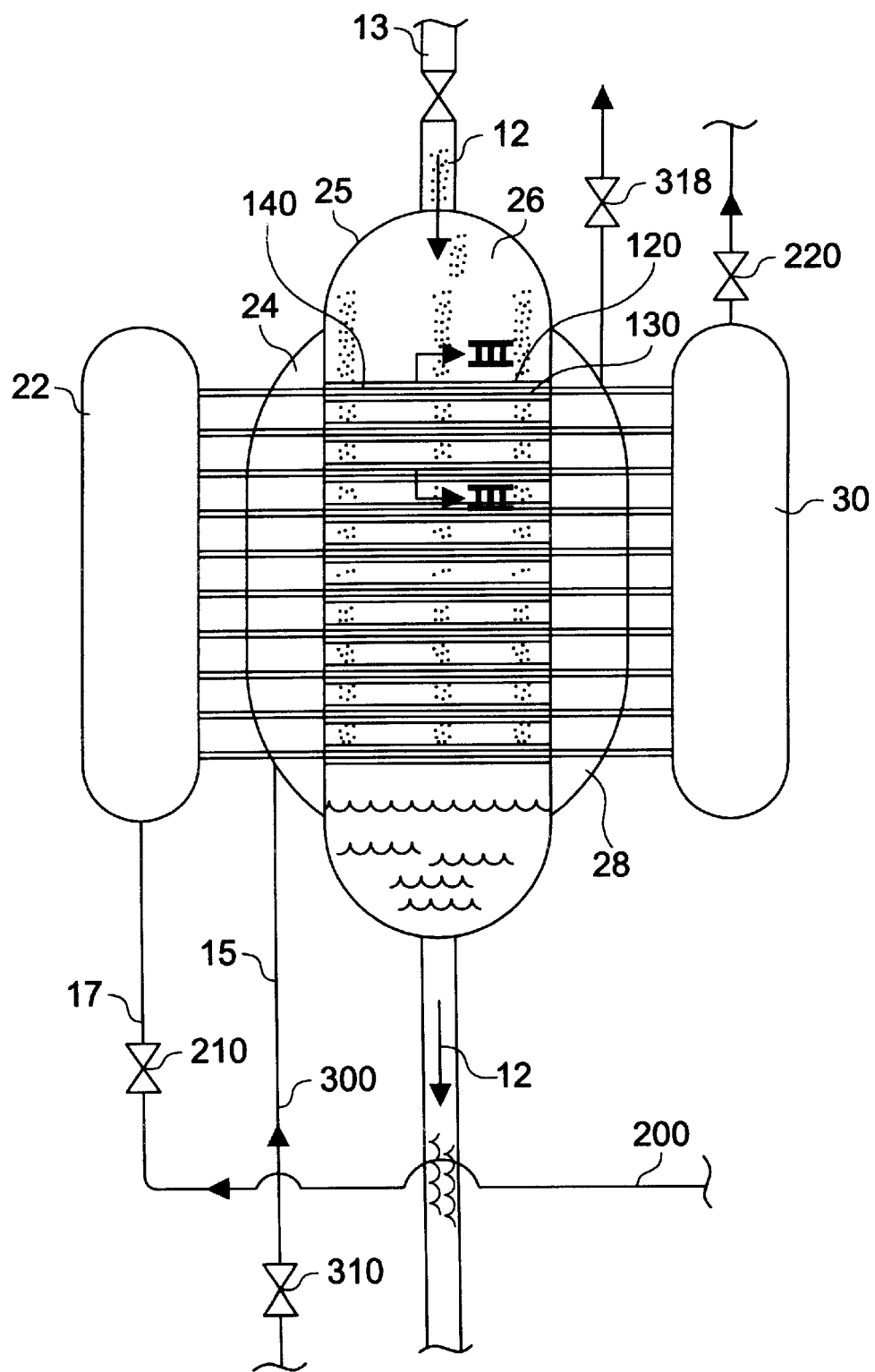
FIG. 2 is a schematic representation of a preferred embodiment of a single heat transfer unit of the system of FIG. 1.

The working fluid loop 15 as depicted in FIGS. 1 and 2 includes the following portions of the heat transfer units 25 and 35: the working fluid input vessels or plenums 24 and 34, the working fluid output vessels 28 and 38, and the working fluid passages 120 (FIG. 3) adapted to carry the working fluid between the inlet and outlet vessels. The working fluid resides in the heat transfer units in a heat transfer section of the working fluid transmission line 300 of the loop 15. The heat transfer sections include all portions of the heat transfer units that hold the working fluid and that are interconnected and any extensions out of the heat transfer units. As shown in FIG. 1, this includes every nitrogen passage between valve 310 and valve 318 and every nitrogen passage between valve 312 and valve 320.

The loop 15 also includes a first stage working fluid receiver or storage vessel 64, heat transfer unit working fluid input valves 310 and 312, heat transfer unit working fluid output valves 318 and 320, a first stage working fluid receiver output valve or pressure-regulator control valve 340, a second stage working fluid receiver or common vessel 62, a second stage working fluid receiver output valve or flow control valve 330, a gas turbine 70 driving an electric power generator 72, and a working fluid cooling tank 90. The nitrogen working fluid moves through the working fluid loop 15 through the piping, or conduits, of a working fluid transmission line 300. In this embodiment, as explained below, no pumps are utilized to move the working fluid through the working fluid loop 15.

The loop 15 also includes a working fluid by-pass line 350 extending between the outlet of the second stage working fluid receiver 62 and the cooling tank 90 for by-passing the turbine 70 if necessary.

The nitrogen gas is moved through the working fluid loop 15 by using pressure differentials. The pressure differentials are controlled by isolating sections of the working fluid piping of the loop 15 and selectively adding or removing heat within one or more of the sections to achieve the appropriate pressure differential between the sections. Then, valves are opened to connect the adjacent sections to allow high pressure working fluid to expand into a lower pressure portion of the loop 15. The pressures are controlled such that a predetermined mass of nitrogen working fluid is moved, or thermodynamically pumped, from one section to the next. In this way, without the use of mechanical pumps, a constant mass of nitrogen gas working fluid is effectively moved around the loop 15 to gain heat at the heat transfer units, drive the turbine 70 and generator 72 and be returned to the heat transfer units.

As shown in FIGS. 1 and 2, the working fluid input vessel 24 receives nitrogen gas from the working fluid transmission line 300 through a valve 310. The nitrogen gas in the vessel 24 flows through the passages 120 in the heat transfer unit 25.

While the nitrogen gas is in the passages 120 in the heat transfer unit 25, the steam flowing through the chamber 26 heats the tubes 140 and the nitrogen gas in the passages 120. Heating the nitrogen gas working fluid increases the pressure of the nitrogen working fluid in the passages 120 as well as connected portions of the heat transfer section 858 of the loop 15 between the valves 310 and 318. The valves 310 and 318 are maintained closed while the nitrogen gas working fluid is heated by the steam to a predetermined pressure range. When the pressure of the nitrogen gas in the working fluid heat transfer section has increased to a predetermined level, and provided that the pressure in the first stage working fluid receiver 64 is at a lower predetermined level, valve 318 opens to permit the nitrogen gas to expand, due to the higher pressure of the nitrogen gas in the working fluid heat transfer section 858, through the fluid transmission line 300 to the first stage working fluid receiver 64. Once the expansion into the receiver 64 is complete, the valve 318 closes. This expansion of the nitrogen gas moves a predetermined mass of the nitrogen working fluid into the receiver 64 and leaves a portion of nitrogen gas in the working fluid heat transfer sections including the passages 120 within the heat transfer unit 25.

As discussed in detail below, the heat transfer units 25 and 35 are operated out of phase so that valve 318 and valve 320 alternately close and open to allow the higher pressure nitrogen gas to expand and flow alternately from the working fluid heat transfer sections corresponding to the heat transfer units 25 and 35 to the primary receiver 64. Once the pressure has increased sufficiently in the first stage working fluid receiver 64 to a predetermined range, a pressure-regulator control valve 340 regulates the flow of the working fluid such that the pressure downstream of valve 340 is within a predetermined range. From valve 340, the working fluid flows to a second stage working fluid receiver 62. In an alternative embodiment, receiver 62 may not be included and the working fluid flows from receiver 64 directly to turbine 70.

The second stage working fluid receiver 62 receives working fluid from the first stage working fluid receiver 64 through operation of the valve 340 as needed to develop sufficient pressure to drive the turbine 70 and generator 72. As described below in detail with regard to FIG. 5, the second stage working fluid receiver 62 may be fed working fluid by a plurality of primary working fluid tanks, like receiver 64, each of which is fed by one or more heat transfer units. Valve 330, downstream from the second stage working fluid receiver 62, is operated to provide appropriate pressure and mass flow to the inlet of the gas turbine 70 that drives the generator 72.

It is desirable that the opening of valves and closing of valves is precisely timed. Failure to open and close valves timely may result in a loss of energy, thereby reducing the efficiency of the system. Thus, the valves 318 and 320, as well as the other valves in the system 10, preferably operate under a programmable control (not shown) based on input of temperature, pressure and status sensors (not shown) located at appropriate points in the system 10. Also an advantage may be gained from the momentum of the working fluid expanding from one section to the next. The downstream section may experience a pressure transient which is higher than the instantaneous equalized pressure of the two connected sections. Timely closing of the valve between the sections before flow direction reverses can capture this higher pressure in the downstream section, thereby increasing the thermal efficiency of the system.

The nitrogen gas expands through and exits the gas turbine 70 and flows through check valve 336 to the cooling tank 90 where the nitrogen gas is cooled as required to a lower temperature and pressure suitable for mixing with the exhaust gas from the gas turbine.

Passing through the cooling tank 90 is a cooling loop 14 containing water that is pumped by a pump 114 from a cooling tower 100 through the cooling tank 90. The heat removed from the working fluid by the cooling loop 14 is transferred to the atmosphere by the cooling tower 100. Cooling tank 90 functions as a heat sink for the heat in the working fluid when normal flow through the gas turbine 70 is interrupted. Cooling tank 90 further provides a means of regulating the back pressure at the exhaust of the gas turbine and provides additional waste heat removal capacity.

In review of the preceding discussion, a closed loop working fluid system described above consists of major components, a process control system and a configuration of piping and valves. The system's primary function is to transfer heat from the steam to the gas turbine 70. The system's working fluid flows, under pressure, from the heat transfer units' working fluid input vessels 24, 34, through the heat transfer passages 120 and exits the heat transfer units' working fluid output vessels. The working fluid then flows, under pressure, to the first-stage working fluid receiver 64, through a pressure-regulating control valve 340 to the second-stage working fluid receiver 62. From the second-stage working fluid receiver 62, the working fluid flows under pressure through control valves 330 and 361 to the inlet of the gas turbine 70. In the gas turbine 70, most of the energy in the working fluid is transferred to the turbine blades and thence to the turbine shaft as rotational torque. That rotational torque is transferred to the shaft of the coupled generator 72, which rotates the generator's armature in an electromagnetic field, producing electricity. After giving up energy to the turbine blades, the working fluid flows at reduced pressure from the gas turbine 70 to the inlet port of the pressure control vessel, or cooling tank 90. From the pressure control vessel 90 the working fluid flows, under reduced pressure, back to the heat Transfer Units' working fluid input vessels 24 and 34.

Figure 3:
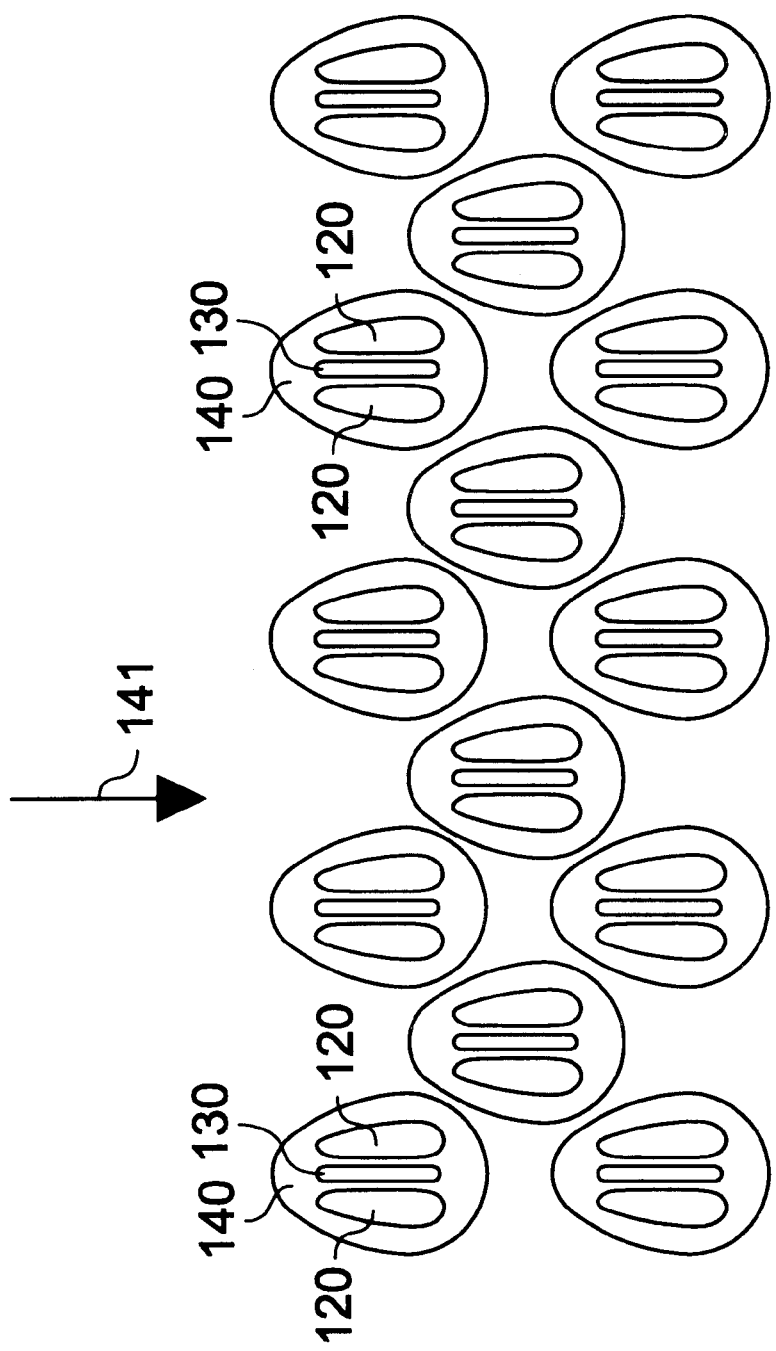
FIG. 3 is a view taken along section line III—III of FIG. 2.

The waste heat removal loop 17 as depicted in FIGS. 1–3 includes the waste heat removal fluid input tanks 22 and 32, the waste heat removal fluid output tanks 30 and 40, the input valves 210 and 212, the output valves 220 and 222, the passageways 130 of the heat transfer tubes 140 adapted to carry the cooling fluid, the waste heat removal fluid transmission line 200, pressure surge tank 192, and the waste heat removal fluid cooling tower 208.

The waste heat removal provides a cooling apparatus to cool the working fluid in the heat transfer sections of the heat transfer units 25 and 35 after the heated nitrogen gas has expanded downstream to the receiver 64 and the respective valves 318 or 320 have closed. With reference to the heat transfer unit 25, the remaining nitrogen gas in the working fluid heat transfer section 858 must be cooled to reduce its pressure below that of the working fluid pressure upstream in the working fluid transmission line 300. This upstream section of line 300 includes the nitrogen in the cooling tank 90 and in the piping of the line 300 up to the valve 310. The waste heat removal fluid accomplishes this by cooling the nitrogen gas remaining in the heat transfer unit 25 portion of the working fluid heat transfer section 858.

Lowering the temperature and pressure in the chamber 26 allows, upon opening of the valve 310, the higher pressure working fluid in the working fluid transmission line 300 which is upstream from the valve 310 to expand from the line 300 into the heat transfer unit working fluid chamber 26. Once the expansion has taken place and the predetermined mass of nitrogen has been moved into the chamber 26, the valve 310 closes again. The working fluid cycle is now complete and commences again with the flow of steam through the heat transfer unit to heat the nitrogen gas as described above.

The heat gained by the waste heat removal fluid in loop 17 while in the heat transfer unit 25 is eventually dissipated to the environment by transferring the heat into a body of water or as shown in FIG. 1, into the air by a cooling tower 208. This gained heat by the waste heat removal fluid in loop 17 is analogous to the waste heat by-product of the work of pumping the working fluid in systems utilizing pumps. Although circulation of the helium may be by natural circulation, under certain circumstances the circulation may be accomplished through a combination of pumps and natural circulation.

In review of the above discussion, the waste heat removal system is a closed-loop system including a process control system and a configuration of piping, valves, and related equipment, through which the waste-heat removal fluid flows by natural and/or forced circulation. The primary function of the system is to remove waste heat from the working fluid and transport that heat to the ultimate heat sink, the environment. The waste heat removal fluid flows under pressure from the heat transfer units' waste heat fluid input vessels 22, 32, through the heat exchange passageways 130, where it takes in work by-product waste heat from the working fluid, and then flows to the waste heat fluid outlet vessels 30, 40. The heated waste heat removal fluid flows, under pressure, from the waste heat fluid outlet vessels 30, 40 to the cooling tower 208 or other ultimate heat-sink interface equipment. After giving up the waste heat to the ultimate heat sink, the waste heat removal fluid flows under pressure to the waste heat fluid input vessels 22, 32. The waste heat removal system may also be used to "dispose" of heat from miscellaneous sources, such as bearing cooling systems, lubricating oil cooling systems, and generator cooling systems, among others.

A number of different types of valves are used throughout the various embodiments of the present invention. Combination control valves and check valves are illustrated on FIGS. 1 and 4 as valves 210, 212, 310, 312, 318, 320, 410, 412, 420, 422, 430, 433, 510, 512, 520, 522, 710, 712 and 722. Control valves are utilized to ensure the proper flow conditions of the system are adhered to. Check valves prevent any backflow of fluids. Other control valves may stand alone. For the embodiment of FIG. 1 these would be valves 330, 351, 816, 817 and 819. Still other valves, such as valve 340, are pressure-regulator control valves, which ensure that a certain predetermined pressure is maintained on the downstream side of the valve. Other valves, such as valve 336, are stand-alone check valves.

Furthermore, various other valves are envisioned to be used throughout the described system, such as relief valves and isolation valves. Relief valves are positioned at various locations throughout the system and function to relieve the system of undesired pressure buildup. The relief valves may each be a single valve, or may be several valves arranged in series, parallel or an array. Isolation valves are placed at locations surrounding other valves and/or equipment to facilitate the performance of necessary maintenance.

Refer now to FIG. 1 and Table 1. The operation of the heat work system 10 may be described as cycling through eight phases.

TABLE 1

| | Heat Transfer Unit 25 | | | | | | | Heat Transfer Unit 35 | | | | | | |
|---|---|---|---|---|---|---|---|---|---|---|---|---|---|---|
| Phases | Fn | 210 | 318 | 410 | 310 | P | Q | Fn | 212 | 320 | 412 | 312 | P | Q |
| 1 | 2 | ● | ● | ● | ● | 3,200 | | 1 | ● | ● | ● | ● | 50 | |
| 2 | 2–1 | ● | ○ | ● | ● | 3,200–1600 | | 1–2 | ● | ● | ● | ○ | 50 – 450 | |
| 3 | 1 | ● | ● | ● | ● | 1,600 | | 2 | ● | ● | ● | ● | 450 | |
| 4 | 1 | ○ | ● | ● | ● | 1,600–50 | (−) | 2 | ● | ● | ○ | ● | 450 – 3,200 | (+) |
| 5 | 1 | ● | ● | ● | ● | 50 | | 2 | ● | ● | ● | ● | 3,200 | |
| 6 | 1–2 | ● | ● | ● | ○ | 50–450 | | 2–1 | ● | ○ | ● | ● | 3,200 −1600 | |
| 7 | 2 | ● | ● | ● | ● | 450 | | 1 | ● | ● | ● | ● | 1,600 | |
| 8 | 2 | ● | ● | ○ | ● | 450–3,200 | (+) | 1 | ○ | ● | ● | ● | 1,600–50 | (−) |

Fn is the relative mass of the working fluid,
P is the relative pressure of the working fluid
Q indicates if heat is being taken in (+) by the working fluid or given up (−) by the working fluid,
"●" indicates a closed valve,
"○" indicates an open valve.

The present invention includes at least four quick response control valves for each heat transfer unit. The four quick response control valves for the heat transfer unit 25 are 210, 310, 318 and 410. The quick response control valves open and close in coordination to control working fluid mass flow into and out of each heat transfer unit and to control two heat transfers which occur in each heat transfer unit.

The first of those heat transfers, from the steam to the working fluid, occurs when the steam flow control valve 410 is open and the other three control valves 210, 310 and 318 are closed. The second heat transfer is the transfer of waste heat from the working fluid into the waste heat removal fluid, which occurs when the waste heat removal fluid control valve 210 is open and the other three control valves 310, 318 and 410 are closed. The third control valve 310 opens to allow a controlled quantity of working fluid to flow into the heat transfer unit 25. Valve 310 closes when the controlled quantity of the working fluid has entered the heat transfer unit 25. The fourth control valve 318 opens to allow a controlled quantity of working fluid to flow from the heat transfer unit 25. Valve 318 closes when the controlled quantity of fluid has exited the unit 25.

In phase 1, all of the valves 210, 318, 410 and 310, associated with the heat transfer unit 25 and valves 212, 320, 412 and 312 associated with the heat transfer unit 35, are closed. In heat transfer unit 25, the mass of nitrogen in the heat transfer section 858 has been heated and the relative pressure is at about 3,200. No steam is flowing, so the nitrogen is not gaining heat. The nitrogen may be held at this condition until the pressure in the downstream section of the loop 15 is appropriate to open the valve 318 to allow the nitrogen working fluid to expand out of the section 858. Conversely, the duration of phase 1 may be shortened, even to zero, if related control parameters are satisfied. In heat transfer unit 35, the mass of nitrogen is at a negligible relative pressure, denoted by the relative value 50.

In phase 2, valve 318 has been opened to allow the heated nitrogen gas to expand out of the section 858 into the first stage working fluid receiver 64. The relative pressure of the nitrogen in heat transfer unit 25, having been released to expand into the receiver 64, drops by about one-half from 3,200 to 1,600. About half the nitrogen gas is transferred to the receiver 64, leaving about half of the nitrogen in the heat transfer section 858. Thus, the relative mass of the nitrogen in the heat transfer section 858 is reduced by half from 2 to 1. Simultaneously, also in phase 1, valve 312 associated with the heat transfer unit 35 opens to allow nitrogen from the upstream working fluid section, including cooling tank 90, to flow through the working fluid input tank 34 and cooling passages 130 of the heat transfer unit 35.

As a result, the relative mass of the nitrogen in the heat transfer section of the heat transfer unit 35 doubles from 1 to 2. The pressure rises to the approximate pressure of the nitrogen in line 300 upstream of the heat transfer unit. Enough heat must be removed from the nitrogen in the heat transfer unit 35 to lower the pressure to a level such that at the instant in time when a set amount of nitrogen has flowed into the heat transfer unit, 1 to 2 in the embodiment described with FIG. 1, the pressure of the nitrogen in the heat transfer unit 35 is less than or equal to the pressure of the nitrogen upstream of the heat transfer unit 35. Although the phases have been described in terms of discrete phases, the present invention is not so limited and it contemplates that there can exist an overlap of phases. For example, it is possible for valve 318 to be open, allowing a mass of nitrogen to flow from the heat transfer unit 25, while valve 210 opens, allowing helium to flow through the heat transfer unit 25, thus overlapping phases 2 and 4.

In phase 3, all the valves are again closed. Further, the relative pressure in heat transfer unit 25 remains at about 1,600 while the pressure in heat transfer unit 35 remains at about 450. The duration of phase 3 can be shortened, even to zero, if control parameters are satisfied.

In phase 4, valve 210 opens to allow helium cooling fluid to flow through the heat transfer unit 25. This results in a drop in the pressure of the nitrogen remaining in heat transfer unit 25 from about 1,600 to a negligible relative pressure of about the value 50 with no change in the mass of the nitrogen. Also in phase 4, the valve 412 opens to allow steam to enter the heat transfer unit 35 and heat the nitrogen in heat transfer unit 35. As a result there is an increase in the pressure of the nitrogen in heat transfer unit 35 from about 450 to about 3,200.

In phase 5, all of the working fluid valves are closed. The pressure in heat transfer unit 25 remains at about 50 and the pressure in heat transfer unit 35 remains at about 3,200. The duration of phase 5 can be shortened, even to zero, if control parameters are satisfied.

In phase 6, valve 310 opens to allow nitrogen to flow into heat transfer unit 25 with an increase of relative pressure from about 50 to about 450, the approximate pressure of the nitrogen in line 300 upstream of the heat transfer unit. The relative mass of the nitrogen in heat transfer unit 25 is increased from 1 to 2. Simultaneously, valve 320 opens to allow expansion of nitrogen from the heat transfer section of unit 35 to the first stage working fluid receiver 64. The pressure of the nitrogen and its mass is reduced by about one-half in heat transfer unit 35. Again, note that valve 318 remained closed while valve 320 was opened.

In phase 7, as in phases 3 and 5, the working fluid valves remain closed. The pressure in the heat transfer unit 25 remains at about 450 and the pressure in the heat transfer unit 35 remains at about 1,600. The duration of phase 7 can be shortened, even to zero, if control parameters are satisfied.

Phase 8 is similar to phase 4, but with the modes of heat transfer units 25 and 35 switched. In phase 8, valve 410 opens to allow the steam to heat the nitrogen in heat transfer unit 25, with a resultant increase in the relative pressure of the nitrogen in heat transfer unit 25 from about 450 to about 3,200. At the same time, valve 212 opens to allow helium to flow through the heat transfer unit 35, causing the pressure of the nitrogen in the heat transfer unit 35 to decrease from about 1,600 to a negligible relative pressure of about 50.

Refer now to FIGS. 2 and 3, FIG. 2 shows schematically the internal structure of heat transfer unit 25. The function of the working fluid vessels 24 and 28 and the cooling fluid vessels 22 and 30 of the heat transfer chamber 26 have been discussed in detail above. As illustrated in FIG. 3, the passages 120 and the passages 130 of tubes 140 carry the nitrogen and helium gases through the heat transfer unit 25.

The heat transfer tubes 140 extend through the heat transfer chamber 26. The number of tubes 140 required depends on geometry, surface area and spacing of the tubes as well as the design parameters of the heat transfer unit. The volume of the working fluid passages 120 may be greater than the combined volume of the vessels 24 and 28 as appropriate to insure that a sufficient pressure increase results from the heat gained by the mass of nitrogen in the passages 120 from the steam/water heating fluid passing over the tubes 140.

In the embodiment illustrated in FIG. 3, to enhance the heat transfer between the nitrogen and the steam/water, to enhance the heat transfer between the helium and the nitrogen, and to reduce the heat transfer between the helium and other components of the heat transfer unit 25, the helium is carried in cooling passages 130 of tubes 140 with working fluid passages 120 positioned on both sides. The tubes 140 are shown schematically in FIG. 3 in a staggered array, but other arrangements are possible. Also, note the teardrop cross-section of tubes 140 and their close proximity to each other enhances heat transfer between the steam/water, flowing in the direction of arrow 141, and the tubes 140. The tubes 140 may, however, have other geometric shapes and may be spaced differently.

Figure 4:
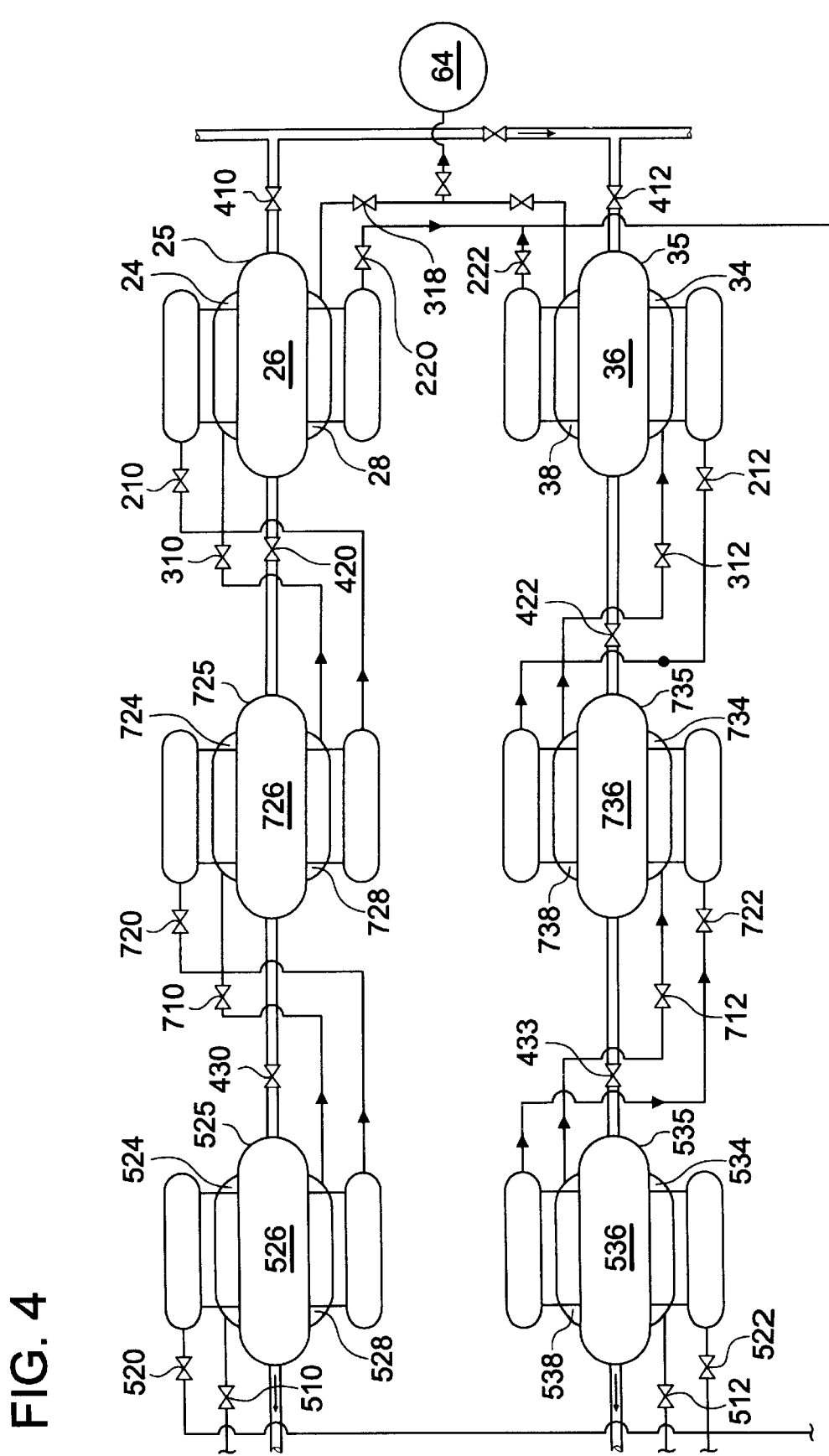
FIG. 4 is a schematic representation of a second preferred embodiment of the present invention where heat transfer units are arranged in series of pairs.
Figure 5:
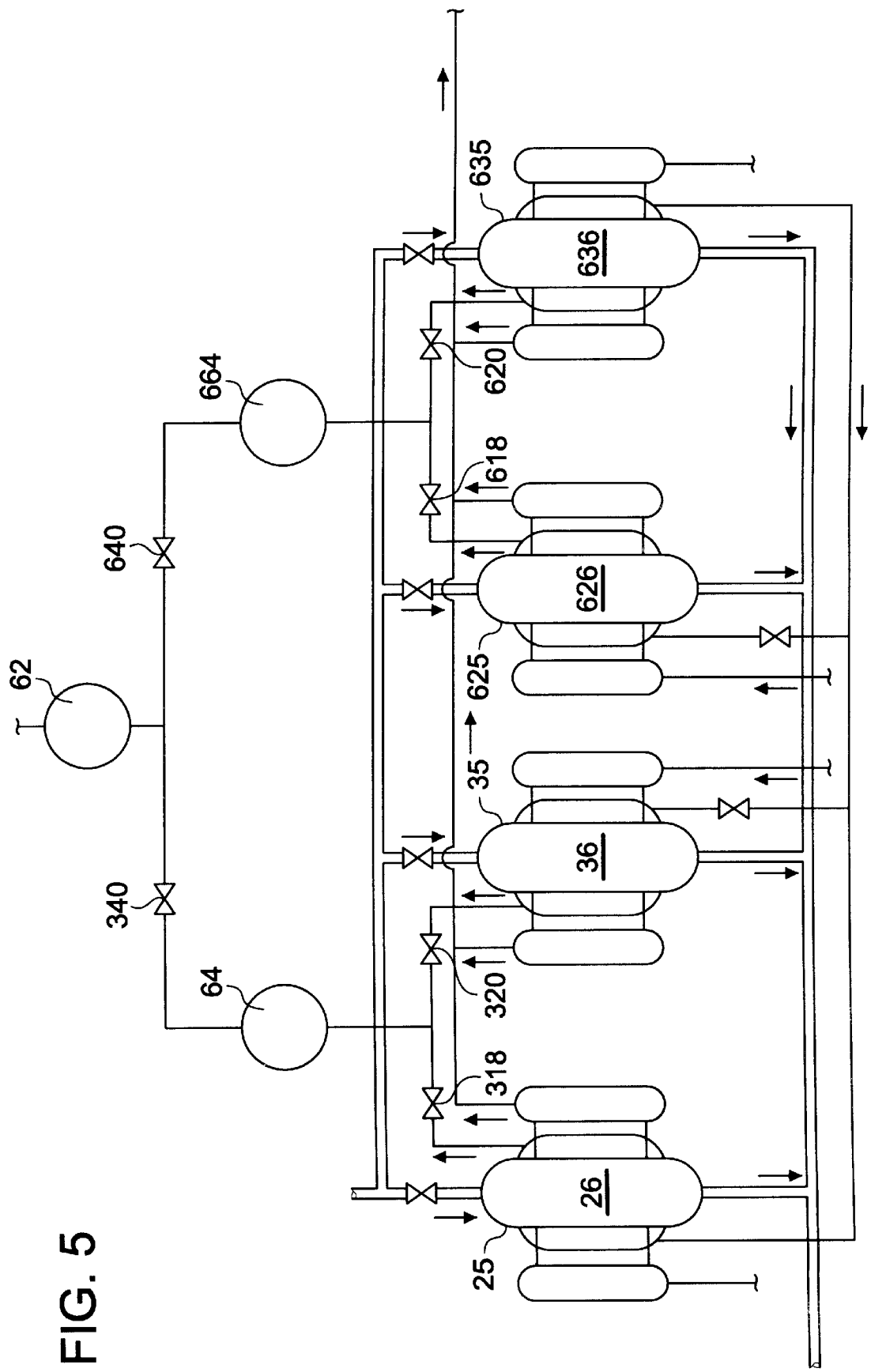
FIG. 5 is a schematic representation of a third preferred embodiment of the present invention where heat transfer units are arranged in parallel pairs.

Refer now to FIGS. 4 and 5 which illustrate that the heat transfer units may be used in various sized arrays. FIG. 4 shows two trains of heat transfer units. One train includes heat transfer units 25, 725 and 525 in series, and the other train includes heat transfer units 35, 735 and 535 in series. Both trains feed a single first stage working fluid receiver 64. As in the heat transfer units 25 and 35, heat transfer units 725, 735, 525 and 535 each have a corresponding heat transfer section.

For the arrangement of FIG. 4, the volume of the working fluid heat transfer section of each downstream heat transfer unit will be smaller in size than to the volume of the heat transfer section of the heat transfer unit immediately upstream. Thus, the volume of the working fluid section extending between valves 510 and 710 is larger than the volume of the section between valves 710 and 310, which in turn is larger in volume than the section between 310 and 318. This provides for the movement of the same amount of mass of the nitrogen gas working fluid into increasingly smaller volumes to achieve increasing pressure of the working fluid. Therefore, under this series embodiment, heat transfer units 525 and 535 are larger than heat transfer units 725 and 735, and heat transfer units 725 and 735 are larger than heat transfer units 25 and 35.

Referring to FIG. 4, steam enters the heat transfer units 25 and 35 through valves 410 and 412. The steam then travels to heat transfer units 725 and 735 through valves 420 and 422. Finally, the steam arrives at heat transfer units 525 and 535. The steam is condensed to water in the process of flowing through the three heat transfer units and returned to the steam generation plant 11. It is possible that all of the latent heat of vaporization could be given up in heat transfer units 525 and 535. In that case, the steam/water entering units 525 and 535 would be all steam. However, some of the latent heat of vaporization may be given up in the heat transfer units preceding units 525 and 535 in the trains.

The nitrogen heated in heat transfer unit 525 expands into the working fluid heat transfer section of heat transfer unit 725. The nitrogen heated in heat transfer unit 725 expands into the working fluid heat transfer section of heat transfer unit 25. The nitrogen heated in heat transfer unit 535 expands into the working fluid heat transfer section of heat transfer unit 735. The nitrogen heated in heat transfer unit 735 expands into the working fluid heat transfer section of heat transfer unit 35. The nitrogen from heat transfer units 25 and 35 expands into the first stage working fluid receiver or storage vessel 64.

As to the cooling fluid system of the embodiment of FIG. 4, the helium cooling fluid is cycled sequentially through the heat transfer units, paralleling the flow of nitrogen through the units. Particularly, the helium cooling fluid is cycled from line 200 through heat transfer units 525, 725 and 25, respectively, and through heat transfer units 535, 735 and 35, before re-entering line 200. This flow configuration will prevent any backflow of helium cooling fluid in the waste heat removal 17.

The movement of nitrogen from heat transfer units 525 and 535 to heat transfer units 725 and 735 and then to heat transfer units 25 and 35 is accomplished by selectively cooling the working fluid with the cooling system and selectively opening and closing the valves between the heat transfer units 25, 35, 725, 735, 525 and 535, and the first stage working fluid receiver 64 in the manner described above with respect to FIG. 1 and Table 1, to move the gas in the direction of the first stage working fluid receiver 64.

FIG. 5 shows another alternative embodiment, wherein the heat transfer units 25, 35, 625 and 635 are arranged in parallel sets, each set including two heat transfer units. The operation of the heat transfer units is similar to that described above with respect to FIG. 1. As in the heat transfer units 25 and 35, heat transfer units 625 and 635 each have a respective heat transfer section. Each set of heat transfer units feeds one of the first stage working fluid tanks 64 and 664 similar to the manner described above. The heat transfer units 25 and 35 alternately feed the receiver 64, while the heat transfer units 625 and 635 alternately feed the tank 664. The working fluid tanks 64 and 664 feed the second stage working fluid receiver or common vessel 62 by operation of pressure-regulator control valves 340 and 640.

While several embodiments have been illustrated showing either a pair of heat transfer units (FIG. 1), a pair of trains of heat transfer units (FIG. 4) and two pairs of heat transfer units (FIG. 5), other combinations, such as three or more pairs of heat transfer units, may be used.

As noted above, the heat transfer units are operated out of phase. However, it is also important to maintain a constant flow of steam through the steam/water line 12. With reference to Table 1, the steam valves 310 and 312 are only open in phases 4 and 8 for a system with a single pair of heat transfer units. It follows that, to provide an uninterrupted flow path for the steam, that for the embodiment described, at least two pairs of parallel oriented heat transfer units would be required.

The number of standard heat transfer units required for any given application would be a function of the size of the application. For example, if a 400 megawatt application requires four pairs of standard heat transfer unit trains, then an 800 megawatt application would require eight pairs of standard heat transfer unit trains. As discussed above, the steam turbine 76 may be sized to allow greater standardization of the heat transfer unit design.

Figure 7:
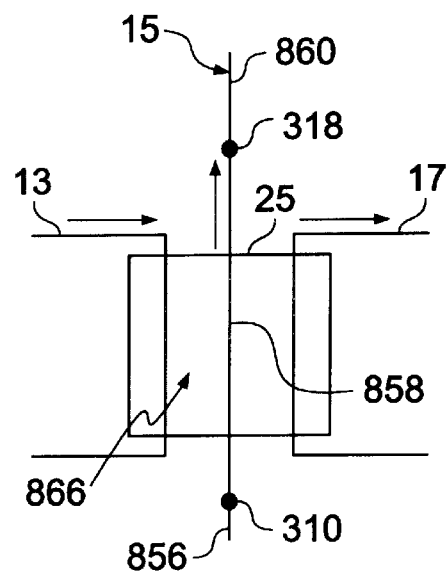
FIG. 7 is a simplified schematic representation of the heat transfer unit of FIG. 1.

FIG. 7 is a simplified schematic representation of the heat transfer unit of the present invention. As illustrated in FIG. 7, a heat source is introduced to a heat exchanger or heat transfer unit 25 through loop 13. A working fluid adapted to accept heat and give up heat is also introduced to the heat exchanger 25 through a heat transfer working fluid conduit or loop 15. Further, a cooling apparatus adapted to remove heat is introduced to the heat exchanger 25 through a conduit or loop 17.

The heat transfer working fluid conduit 15 is adjacent to both the loop 13 and the conduit 17 within the heat transfer unit 25. A heat transfer section 858 of loop 15 extends between the valves 310 and 318 and includes the heat transfer unit 25.

Valve 310 is opened to allow the working fluid to expand from an upstream section 856 of the working fluid loop 15 into the heat exchanger or heat transfer unit 25. Valve 310 is closed when a predetermined pressure is reached indicating that a predetermined mass of working fluid has expanded into the heat exchanger 25. As the heat source is introduced to the heat exchanger 25, heat is transferred to the working fluid in the loop 15 at a heat transfer location 866 within the heat transfer section 858. Then valve 318 opens, allowing the working fluid to expand to the downstream section 860 of the working fluid loop 15. The valve 318 is then closed.

Prior to valve 310 reopening to allow the expansion of more working fluid into the heat exchanger 25, the pressure of the working fluid within the heat exchanger 25 is decreased by operation of the cooling apparatus. The cooling fluid within conduit 17 accepts heat from the working fluid remaining in the heat exchanger 25 until a predetermine pressure of the working fluid is reached.

In this way a working fluid is enabled to both take on and give away heat at a single heat transfer location. Although FIG. 7 illustrates the heat transfer location 866 within heat exchanger 25, an alternative embodiment includes a heat transfer section encompassing a pair of heat exchangers. In this way, with the locations where a transfer of heat is occurring in open fluid communication, a heat transfer section can include more than one heat transfer location and thus more than one heat exchanger.

Figure 8:
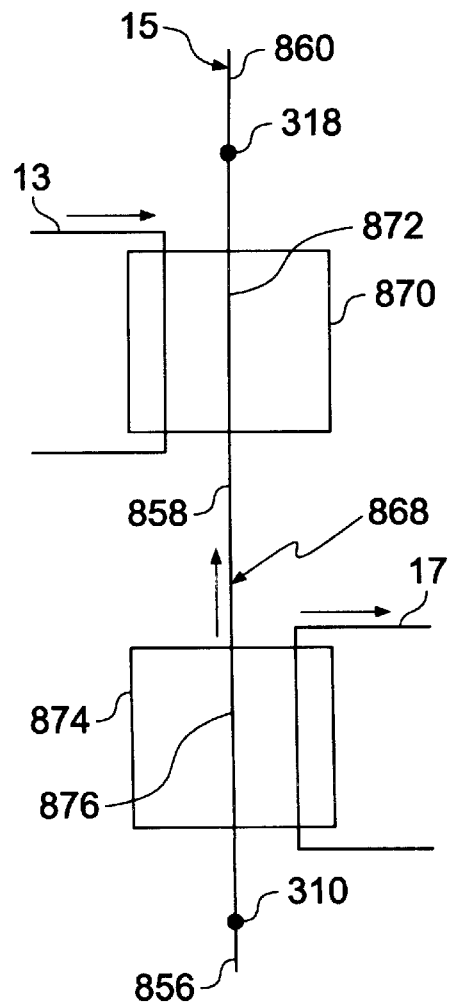
FIG. 8 is view like FIG. 7 showing an alternate embodiment of the heat transfer unit.

Referring now to FIG. 8, loop 15 extends through two heat exchangers 870 and 874, both of which are positioned between valves 310 and 318, which defines the working fluid heat transfer section 858. A first heat transfer location 872 is shown within heat exchanger 870, and a second heat transfer location 876 is shown within heat exchanger 874.

In operation, valve 310 opens to allow the working fluid to expand into the heat transfer section 858. Valve 310 closes after a predetermined amount of working fluid has entered the heat transfer section 858. As the heat source is introduced through loop 13 to heat exchanger 870, heat is imparted to the working fluid in the first location 872. Valve 318 is opened to allow the working fluid to expand downstream of the heat transfer location 868 and then closed.

Prior to valve 310 reopening, the heat remaining in the heat transfer section 858 must be diminished. That heat is imparted to the cooling apparatus at the second heat transfer location 876 in conduit 17 within heat exchanger 874. Since heat exchangers 870 and 874 are in open fluid communication, heat transfer section 858 encompasses both exchangers.

A working fluid supply and recovery system 115, shown schematically on FIG. 1, is envisioned for use with the present invention to recover and supply working fluid. The system 115 is one conventional in arrangement and one of which a person ordinarily skilled in the art is knowledgeable. The working fluid supply and recovery system 115 includes a process control system and a configuration of tanks, heat exchangers, expansion loops, pumps, valves, piping, and related equipment. Primary functions of the system 115 are to supply the working fluid to the working fluid system and to replace fluid which leaks from the working fluid system. When required, for example during maintenance of a heat transfer unit, the system 115 can be used to recover some of the working fluid from the working fluid system and store it in the system's supply and recovery tank. The system also functions as the receiving station for truck/rail-delivered fluid.

A waste heat fluid supply and recovery system 117, shown schematically on FIG. 1, is envisioned for use with the present invention to recover and supply waste heat fluid. The system 117 is one conventional in arrangement and one of which a person ordinarily skilled in the art is knowledgeable. The waste heat fluid supply and recovery system 117 includes a process control system and a configuration of tanks, heat exchangers, expansion loops, pumps, valves, piping, and related equipment. The primary functions of the system 117 are to supply the waste heat removal fluid to the waste heat removal system and to replace fluid which leaks from the waste heat removal system. When required, for example during maintenance of a heat transfer unit, the system can be used to recover some of the waste heat removal fluid from the waste heat removal system and store it in the system's supply and recovery tanks. The system also functions as the receiving station for truck/rail-delivered gas.

Figure 9:
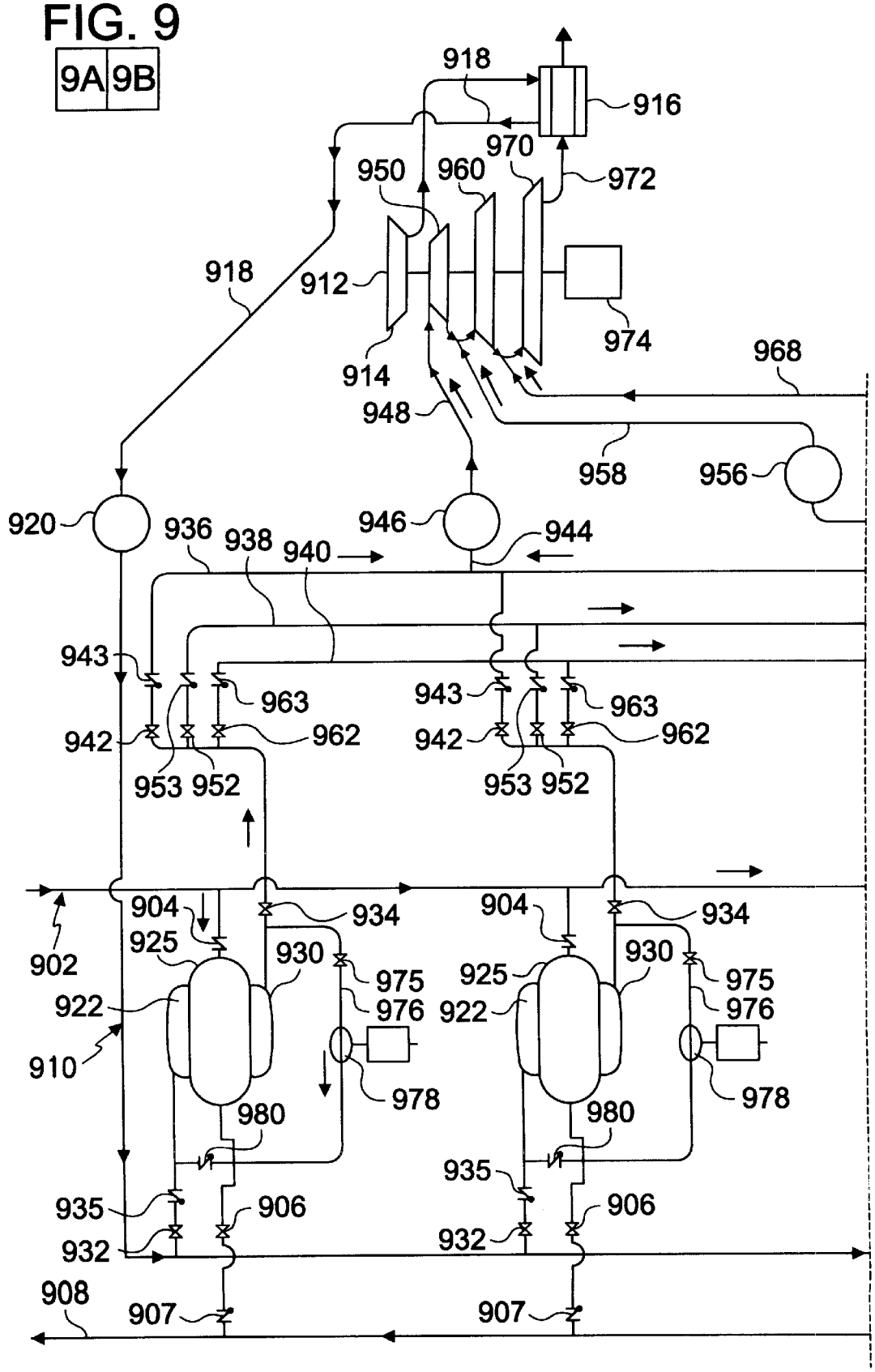
FIG. 9 is a schematic representation of a steam cycle electric power generation system using a heat work cycle system according to another preferred embodiment of the present invention.
Figure 10:
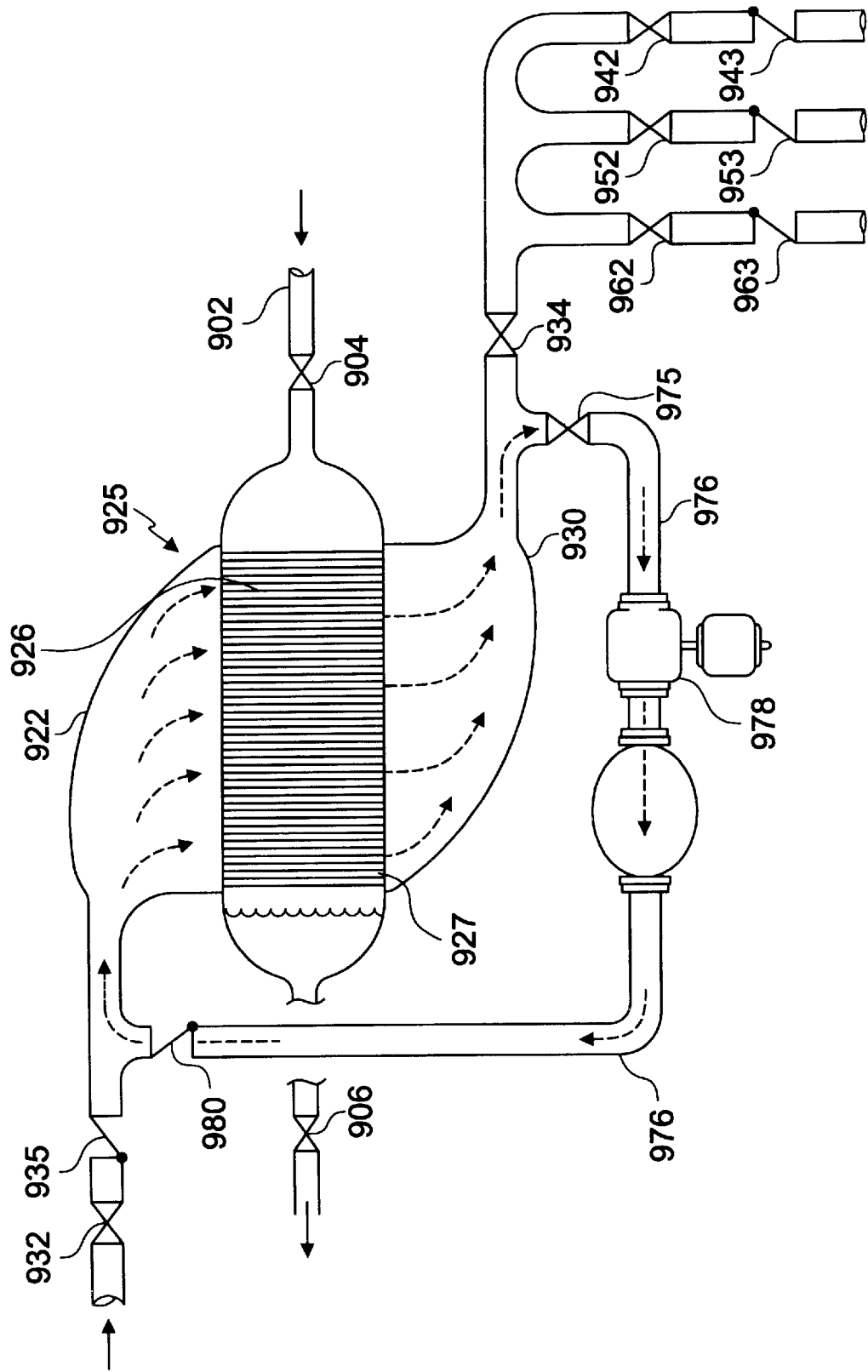
FIG. 10 is a schematic representation of another preferred embodiment of a single heat transfer unit of the system of FIG. 9.

Another preferred embodiment of the present invention, shown in FIGS. 9, 10, is a steam-cycle electric power generation system 900. The system 900 differs from the system 10 in that instead of utilizing three main fluid loops (steam/water, working and waste heat removal), the system 900 only uses two fluid loops. The system 900 includes a steam/water flow loop 902, which provides a flow path for the steam/water, and a once-through heat work cycle 910. The steam may be supplied directly to loop 902, by the steam generating plant 11, or indirectly to loop 902 via the steam turbine 76, where part of the energy in the steam is converted to mechanical energy and thence to electrical energy by the electrical generator 78 (FIG. 1).

The steam/water flow loop 902 and the once-through heat work cycle 910 are configured in a combined-cycle arrangement, That is, the steam/water loop 902 and the once-through heat work cycle 910 are arranged to route steam flow from the steam generating plant 11 (FIG. 1) into the once-through heat work cycle's heat transfer unit 925. In the heat transfer unit 925, heat in the steam is transferred through the heat transfer unit's heat exchange tubing 927 and thence into the once-through heat work cycle's working fluid. The working fluid can be any suitable liquid or gaseous media. Preferably, the working fluid is air.

Refer now to FIGS. 9, 10, where is shown the steam cycle electric power generation system 900 including a main steam/water flow loop 902, through which steam from the steam generating plant 11 flows, and a once-through heat work cycle 910, through which the working fluid, air, flows.

The heat transfer unit 925 is similar to the heat transfer unit 25 described above and works similarly, but is adapted for a two-loop configuration utilizing air as the working fluid. The heat transfer unit 925 includes a chamber 926, the heat exchanger tubing 927, an input tank 922, and an output tank 930. While the system 900 is shown in FIG. 9 as including six heat transfer units 925 operating in parallel, it is to be understood that any suitable number of units 925 may be utilized, and that the units 925 may be stacked in series, as discussed above with respect to other preferred embodiments.

The heat work cycle 910 is now described. The heat work cycle 910 includes an air intake 912, a compressor 914, a regenerator 916, a conduit 918, and a compressed air receiver 920. As with the working fluid loop 15 of FIG. 1, the conduit 918 has junctions at each of the input tanks 922. Positioned between each junction and each input tank 922 is a control valve 932 and a flow check valve 935.

From the output tank 930 a bypass conduit 976 leads back to the input tank 922 to be reintroduced into the heat exchanger tubing 927, which is located in the chamber 926 of the heat transfer unit 925. A control valve 975 and a flow check valve 980 are positioned on the line 976 to check the flow of the heated air being recirculated into the input tanks 922.

Unlike the working fluid loop 15 of the embodiment of FIG. 1, downstream of each output tank 930 the heat work cycle 910 branches into a high pressure line 936, an intermediate line 938, and a low pressure line 940. Positioned between each output tank 930 and the lines 936, 938 and 940 is a control valve 934. The high pressure line 936 includes a high pressure regulator control valve 942, a flow check valve 943, a high pressure receiver 946, a high pressure turbine 950, and conduits 944, 948. The intermediate pressure line 938 includes an intermediate pressure regulator control valve 952, a flow check valve 953, an intermediate pressure receiver 956, an intermediate pressure turbine 960, and conduits 954, 958. The low pressure line 940 includes a low pressure regulator control valve 962, a flow check valve 963, a low pressure receiver 966, a low pressure turbine 970, and conduits 964, 968. The turbines 950, 960 and 970 are connected in series, with a conduit 972 leading from the low pressure turbine 970 to the regenerator 916. An electrical generator 974 is coupled by a common shaft with the turbines 950, 960, and 970. The turbines 950, 960, and 970 act as converters by converting the energy from the heated air into mechanical energy. The turbines 950, 960, and 970 produce rotational torque. The torque is conveyed through the shaft to the armature of the electrical generator 974. The generator 974 acts as a second converter. As its armature rotates in the generator's electrical fields, electricity is produced.

While the turbines 950, 960, and 970 are shown as being connected to the generator 974 via a common shaft, the present invention is not to be so limited. Each turbine 950, 960, and 970 may instead be connected to a respective electric generator.

Although the system 900 has been illustrated as having three turbines, the system 900 may be configured with one, two or more turbines designed for different pressure and temperature conditions.

Air from the atmosphere is taken in through the air intake 912 and is compressed in the compressor 914. The air flows under pressure from the compressor 914 to the regenerator 916, where residual heat from the heat work cycle 910 is transferred into the air. The heated air flows under pressure from the regenerator 916, through the conduit 918 to the compressed air receiver 920. From the compressed air receiver 920, the heated air travels through the conduit 918 through the control valve 932 into the input tank 922. The heated air travels from the input tank 922 into the heat exchanger tubing 927 located in the chamber 926 of the heat transfer unit 925, wherein more heat is transferred to the air from the steam. The heated air then travels into the output tank 930.

From the output tank 930 the air flows through the bypass conduit 976, and back to the input tank 922 to be reintroduced into the heat exchanger tubing 927 located in the chamber 926 of the heat transfer unit 925. The circulation of the air is by the force of natural draft caused by the temperature gradient in the flow path. This natural circulation may be augmented by mechanical means, such as for example a circulation fan 978.

The control valve 934 and the low pressure-regulator control valve 962 are opened in coordination with the opening of the control valve 932 to allow air to flow simultaneously into and from the heat transfer unit 925. The in-flowing air is cooler and at slightly higher pressure than the out-flowing air. Thus, the in-flowing air displaces the remaining heated air from heat transfer unit 925.

When the predetermined mass of air has flowed from heat transfer unit 925, the control valve 934 and the low pressure-regulator control valve 962 are closed. When the predetermined mass of air has flowed into heat transfer unit 925, the control valve 932 is closed.

The steam/water loop 902 for the system 900 is substantially the same as the loop 13 for the system 10. As with the loop 13, the loop 902 has a junction at each heat transfer unit 925 (six of which are shown in parallel the embodiment of in FIG. 9). A control valve 904 is positioned between each junction and the input of each heat transfer unit 925. A control valve 906 and a flow check valve 907 are positioned between the exit of each heat transfer unit 925 and a return conduit 908. The return conduit 908 returns the steam/water flow, depleted of a portion of its heat, to the steam generating plant 11.

Steam flows from the steam generating plant 11 or the steam turbine 76 (FIG. 1), through the steam supply conduit 902, to the heat transfer units 925. At a predetermined condition, the control valve 904 opens to allow steam to flow into the corresponding heat transfer unit 925. The control valve 904 closes at a predetermined condition. The predetermined conditions for opening and closing the control valve 904 are determined by whether or not a heat transfer to the working fluid is currently necessary. The predetermined conditions are based upon a multiple of variables, some of which include the load on the plant, optimization parameters, and or operational characteristics. It is possible, under one scenario, that the control valve 904 would remain continuously open.

A portion of the heat from the steam is conducted through the tubing 927 located within the chamber 926 of the heat transfer unit 925 to the interior surface of the tubing, where it is transferred to the air. The working fluid, air, in the heat transfer unit 925 is at constant volume. The heat addition to the air causes its temperature and pressure to rise. At a predetermined condition, control valve 934 is opened, allowing the air to flow to the pressure-regulator control valves 942, 952, and 962. Although three pressure-regulator control valves are shown in FIGS. 9, 10, the system 900 may be configured with one or more pressure-regulator control valves, arranged in parallel, to supply pressurized flow, at different pressures, to one or more lines. If the system 900 includes only one pressurized line (instead of the three shown in FIG. 9), than the pressure-regulator control valves would not be necessary, as they would be redundant to the control valve 934.

FIG. 9 illustrates the use of the three pressure-regulator control valves 942, 952, and 962 in parallel. The control valves 942, 952, and 962 supply pressure regulated flow to the high-pressure line 936, the intermediate-pressure line 938, and the low-pressure line 940, respectively. The control valves 942, 952, and 962 open and close sequentially. That is, the high-pressure control valve 942 opens first to supply flow to the high-pressure line 936. As the pressure in the line 936 begins to drop to a certain predetermined level, the control valve 942 closes and the control valve 952 opens allowing further flow of the air into the intermediate-pressure line 938. As the pressure in the line 938 begins to drop to another certain predetermined level, the control valve 952 closes and the control valve 962 opens allowing further flow of the air into the low-pressure line 940.

The program controlling the opening and closing of the control valves 942, 952 is based upon a slight difference in pressure between the heat transfer unit 925 and the respective lines 936, 938. The program controlling the opening and closing of the control valve 962 must also factor in the temperature in the heat transfer unit 925. If the temperature in the heat transfer unit 925 drops to a certain level, such a drop signifies that cooler air has entered the heat transfer unit 925 from the conduit 918. This temperature drop would then signify the need to close the control valve 962.

The air flows from the high-pressure line 936, through the conduit 944, into the high-pressure receiver 946. The air then flows from the receiver 946, through the conduit 948, to the inlet of the high-pressure turbine 950.

When the pressure of the air on the upstream side of the control valve 942 is equal to, or slightly higher than, the regulated pressure of the air on the downstream side of the control valve 942, the control valve 942 closes and the intermediate-pressure control valve 952 opens to allow air to flow into the intermediate pressure line 938.

The air flows from the intermediate-pressure line 938, through the conduit 954, into the intermediate-pressure receiver 956. The air then flows from the receiver 956, through the conduit 958, to the inlet of the intermediate-pressure turbine 960, where it is combined with the air exhaust flow from the high-pressure turbine 950.

When the pressure of the air on the upstream side of the control valve 952 is equal to, or slightly higher, than the regulated-pressure of the air on the downstream side of the control valve 952, the control valve 952 closes and the low-pressure control valve 962 opens to allow air to flow into the low-pressure line 940.

The air flows from the low-pressure line 940, through the conduit 964, to the low-pressure receiver 966. The air then flows from the low-pressure receiver 966, through the conduit 968, to the low-pressure turbine 970, where it is mixed with the air exhaust flow from the intermediate-pressure turbine 960.

At a predetermined condition (as discussed above), the control valve 962 is closed.

The air exhaust flow from the low-pressure turbine 970 flows through the conduit 972 to the regenerator 916, where it gives up part of its residual heat to in-flowing working fluid, thus completing the once-through heat work cycle.

The above description and drawings are merely illustrative of preferred embodiments which achieve the objects, features and advantages of the present invention. It is not intended that the present invention be limited thereto. For example, in some of the preferred embodiments described, the working fluid is nitrogen and the cooling fluid is helium. Other similar fluids could be used. In another of the preferred embodiments, air is used as the working fluid, and it is to be understood that other fluids may be used. Further, although one of the preferred embodiments indicates that air is used and then vented from the cycle, it is to be understood that the air may instead be recirculated through the cycle. Also, the embodiments illustrated do not use pumps to move the working fluid. It may be advantageous to use some pumping in particular applications. Further, while the concept of moving a mass unit of a fluid through the system has been described in terms of heating two units and releasing one unit, the present invention is not so limited. For example, 10 mass units could be heated and one unit released, or 1.1 mass units could be heated and one unit released. In addition, the invention has been described in terms of heating and releasing a controlled volume of a working fluid. While this concept has been described by way of the opening and closing of valves, it is to be understood that valves could be partially closed, i.e., there could be a decrease in flow instead of a shut off of flow. Any modification of the present invention which comes within the spirit and scope of the following claims is considered part of the present invention.

What is claimed as new and desired to be protected by Letters Patent of the United States is:

1. A steam cycle electric power generation system comprising:
    a heat source;
    a working fluid;
    a working fluid conduit having a plurality of fluid conduit sections;
    at least one set of first and second working fluid valves positioned on said working fluid conduit and selectively operable for opening and closing said working fluid conduit to flow of said working fluid;
    said working fluid conduit sections including a heat transfer section positioned between said set of first and second working fluid valves, said heat source adapted to input heat to said working fluid in said heat transfer section;
    an outlet section positioned downstream from said heat transfer section;
    an inlet section positioned upstream from said heat transfer section;
    said first valve operable to be opened before heat is added to allow said working fluid to flow from said inlet section into said heat transfer section;
    said set of first and second working fluid valves operable to be closed to isolate and thereby control the volume of a portion of said working fluid in said heat transfer section whereupon said heat source is inputting heat to said isolated portion of working fluid to raise the temperature and pressure of said isolated portion of working fluid in said heat transfer section; and
    said second valve operable to be opened after heat has been input to said isolated portion of working fluid by said heat source to allow said isolated portion of working fluid to flow from said heat transfer section into said outlet section.

2. The system of claim 1, wherein said heat source is steam.

3. The system of claim 2, wherein the system is adapted to capture heat of condensation of said steam.

4. The system of claim 1, further comprising a controller adapted to control the flow of said working fluid so that the mass of said working fluid flowing into said heat transfer section equals the mass of said working fluid flowing out of said heat transfer section.

5. The system of claim 4, further comprising at least two heat transfer units within said heat transfer section, each said heat transfer unit being positioned between a corresponding set of said first and second valves.

6. The system of claim 5, further comprising at least one fluid collection unit and at least one control valve, said heat transfer units being in selective fluid communication with said fluid collection unit, said control valve being positioned between said heat transfer units and said fluid collection unit.

7. The system of claim 6, including a plurality of control valves operable to, with respect to each said heat transfer unit, selectively distribute at least a portion of the flow of said heat source to said heat transfer units.

8. The system of claim 7, wherein said plurality of control valves are operable to maintain the flow of said heat source constant by selectively distributing at least a portion of the flow of said heat source to said heat transfer units.

9. The system of claim 1, wherein said first and second valves are operable to maintain the volume of said isolated portion of working fluid constant during the inputting of heat from said heat source.

10. The system of claim 6, comprising at least six heat transfer units within said heat transfer section, each said heat transfer unit being positioned between a corresponding set of said first and second valves.

11. The system of claim 10, wherein each said heat transfer units is in selective fluid communication with said fluid collection unit.

12. The system of claim 11, wherein at least one control valve is positioned between each said heat transfer unit and said fluid collection unit.

13. The system of claim 12, wherein each said heat transfer unit is sequentially in fluid communication with a plurality of said fluid collection units through a plurality of pressure lines, each successive line being of lower pressure than the preceding pressure line.

14. The system of claim 13, further comprising at least one turbine in fluid communication with one of said fluid collection units and in selective fluid communication with at least one of said heat transfer units through said pressure lines.

15. The system of claim 14, wherein said turbines are mechanically connected to at least one electrical generator via at least one shaft, said turbines being operable to convert the energy from said heated working fluid into mechanical energy.

16. The system of 15, wherein said mechanical energy is rotational torque.

17. The system of claim 16, wherein said at least one generator is operable to convert the rotational torque into electrical energy.

18. The system of claim 17, wherein the turbines are connected in series.

19. The system of claim 17, wherein each said turbine is connected to a respective one of said electrical generators through a respective one of said shafts.

20. The system of claim 14, further comprising a compressor in connection with and adapted to be driven by said at least one turbine for pumping the working fluid to the heat transfer units, said compressor having an inlet in fluid connection with a source of working fluid.

21. The system of claim 20, wherein the working fluid comprises air and said source of working fluid comprises the atmosphere.

22. The system of claim 20, wherein said at least one turbine has an outlet adapted to exhaust the working fluid.

23. The system of claim 22, wherein said at least one turbine outlet is adapted to exhaust the working fluid to the atmosphere.

24. A method of generating electrical power, comprising the steps of:

flowing a heat source through a first conduit;

flowing a working fluid through a second conduit;

selectively opening at least one first valve to allow said working fluid to flow from an inlet section into a heat transfer section;

closing said first valve and at least one second valve to isolate and control the volume of a portion of said working fluid in said heat transfer section;

transferring heat in a controlled volume, heat addition process from said heat source to said isolated portion of working fluid in said heat transfer section; and selectively opening said second valve after said heat addition to allow said isolated portion of working fluid to flow from said heat transfer section to an outlet section.

25. The method of claim 24, wherein said heat transfer section includes at least two heat transfer units, each said heat transfer unit being positioned between a set of said first and second working fluid valves, wherein said flow of the heat source alternates among said heat transfer units.

26. The method of claim 25, wherein the flow of the heat source is kept constant by selectively distributing at least a portion of the flow of said heat source to said heat transfer units.

27. The method of claim 24, further comprising controlling said flow of the working fluid so that the mass of the working fluid flowing into the heat transfer section equals the mass of the working fluid flowing out of the heat transfer section.

28. The method of claim 24, wherein the volume of said isolated portion of working fluid is held constant during the inputting of heat from said heat source.

29. The method of claim 25, wherein heated working fluid selectively flows out of each said heat transfer unit into at least one fluid collection unit in fluid communication with said heat transfer units.

30. The method of claim 29, wherein said flowing of said isolated portion of working fluid from said heat transfer section to an outlet section includes sequentially flowing said isolated working fluid out of each said heat transfer unit through a plurality of pressure lines, each successive line being of lower pressure than the preceding pressure line.

31. The method of claim 30, wherein the pressure lines are in fluid communication with, respectively, high pressure, lower pressure, and lowest pressure turbines, said turbines translating energy from the heated working fluid into mechanical energy.

32. The method of claim 31, wherein each said turbine is connected to an electrical generator through a shaft, the heat from the heated working fluid being translated into rotational torque about the shaft.

33. The method of claim 32, wherein said rotational torque is translated by the electrical generator into electrical energy.

34. The method of claim 31, further comprising pumping the working fluid to the heat transfer units, said pumping accomplished through a compressor, wherein at least one of said turbines is connected to and adapted to drive said compressor.

35. The method of claim 34, further comprising obtaining the working fluid from a working fluid source, said working fluid source being comprised of the atmosphere, said compressor including an inlet adapted to receive said working fluid from said working fluid source.

36. The method of claim 34, further comprising exhausting the working fluid, wherein said at least one of said turbines includes an outlet adapted to exhaust the working fluid.

37. The method of claim 36, comprising exhausting the working fluid to the atmosphere through said outlet.

38. The method of claim 36, further comprising cooling the working fluid after it is exhausted from the turbine outlet.

39. The method of claim 34, further comprising preheating the working fluid before routing it to the heat transfer units.

* * * * *

UNITED STATES PATENT AND TRADEMARK OFFICE
CERTIFICATE OF CORRECTION

PATENT NO.    : 6,052,996

DATED         : April 25, 2000

INVENTOR(S)   : John C. Clark

It is certified that an error appears in the above-identified patent and that said Letters Patent is hereby corrected as shown below:

Column 1, line 3, above BACKGROUND, please insert --This application claims priority from U.S. provisional application serial number 60/038,391, filed February 14, 1997.--

Signed and Sealed this

Fifteenth Day of May, 2001

Attest:

NICHOLAS P. GODICI

Attesting Officer

Acting Director of the United States Patent and Trademark Office